US009510044B1

United States Patent
Pereira et al.

(10) Patent No.: US 9,510,044 B1
(45) Date of Patent: Nov. 29, 2016

(54) TV CONTENT SEGMENTATION, CATEGORIZATION AND IDENTIFICATION AND TIME-ALIGNED APPLICATIONS

(75) Inventors: Jose Pio Pereira, Cupertino, CA (US); Sunil Suresh Kulkarni, Santa Cruz, CA (US); Oleksiy Bolgarov, San Jose, CA (US); Prashant Ramanathan, Mountain View, CA (US); Shashank Merchant, Sunnyvale, CA (US); Mihailo Stojancic, San Jose, CA (US)

(73) Assignee: GRACENOTE, INC., Emeryville, CA (US)

( * ) Notice: Subject to any disclaimer, the term of this patent is extended or adjusted under 35 U.S.C. 154(b) by 359 days.

(21) Appl. No.: 13/327,359

(22) Filed: Dec. 15, 2011

Related U.S. Application Data

(60) Provisional application No. 61/423,205, filed on Dec. 15, 2010.

(51) Int. Cl.
| | |
|---|---|
| *H04H 60/32* | (2008.01) |
| *H04N 21/44* | (2011.01) |
| *H04N 21/8352* | (2011.01) |
| *H04H 60/37* | (2008.01) |
| *H04H 60/56* | (2008.01) |
| *H04H 60/59* | (2008.01) |

(52) U.S. Cl.
CPC ........ *H04N 21/44008* (2013.01); *H04H 60/37* (2013.01); *H04H 60/56* (2013.01); *H04H 60/59* (2013.01); *H04N 21/8352* (2013.01)

(58) Field of Classification Search
CPC .................. H04N 21/4668; H04N 21/44008; H04N 21/8352; H04H 60/37; H04H 60/56; H04H 60/59; H04H 60/73
USPC .................... 705/14.69, 51; 713/176; 725/19
See application file for complete search history.

(56) References Cited

U.S. PATENT DOCUMENTS

| | | | | |
|---|---|---|---|---|
| 8,380,050 | B2 * | 2/2013 | Kummer ................ | H04N 5/782 386/292 |
| 2001/0023436 | A1 * | 9/2001 | Srinivasan et al. ........... | 709/219 |
| 2002/0087979 | A1 * | 7/2002 | Dudkiewicz et al. ................. | G06F 17/30017 725/34 |
| 2004/0172240 | A1 * | 9/2004 | Crockett et al. .............. | 704/205 |
| 2005/0010573 | A1 * | 1/2005 | Garg ............................. | 707/10 |
| 2006/0187358 | A1 * | 8/2006 | Lienhart et al. ... | G06F 17/30802 348/661 |
| 2007/0053513 | A1 * | 3/2007 | Hoffberg ....................... | 380/201 |
| 2007/0092104 | A1 * | 4/2007 | Lee ................................ | 382/100 |
| 2007/0162927 | A1 * | 7/2007 | Ramaswamy et al. ......... | 725/36 |

(Continued)

*Primary Examiner* — An Son P Huynh

(74) *Attorney, Agent, or Firm* — Hultquist, PLLC; Peter H. Priest

(57) ABSTRACT

Content segmentation, categorization and identification methods are described. Content tracking approaches are illustrated that are suitable for large scale deployment. Time-aligned applications such as multi-language selection, customized advertisements, second screen services and content monitoring applications can be economically deployed at large scales. A client performs fingerprinting, scene change detection, audio turn detection, and logo detection on incoming video and gathers database search results, logos and text to identify and segment video streams into content, promos, and commercials. A learning engine is configured to learn rules for optimal identification and segmentation at each client for each channel and program. Content sensed at the client site is tracked with reduced computation and applications are executed with timing precision. A user interface for time-aligned publishing of content and subsequent usage and interaction on one or more displays is also described.

22 Claims, 19 Drawing Sheets

(56) References Cited

U.S. PATENT DOCUMENTS

| | | |
|---|---|---|
| 2008/0062315 A1* | 3/2008 | Oostveen et al. ............ 348/500 |
| 2009/0094159 A1* | 4/2009 | Cunningham et al. ......... 705/51 |
| 2009/0144749 A1* | 6/2009 | Van Luchene et al. ...... 719/313 |
| 2009/0192899 A1* | 7/2009 | Skillen et al. ................. 705/14 |
| 2009/0257732 A1* | 10/2009 | Callaway et al. ..... H04N 5/775 |
| | | 386/291 |
| 2009/0307234 A1* | 12/2009 | Zrike et al. ..................... 707/10 |
| 2009/0328125 A1* | 12/2009 | Gits et al. ..................... 725/118 |
| 2010/0114715 A1* | 5/2010 | Schuster et al. ........... 705/14.69 |
| 2010/0211794 A1* | 8/2010 | Bilobrov ...................... 713/176 |

* cited by examiner

Inputs to Video Segmentation States

S: Audio silence and audio turns, video scene change detect
L: logo detection, logo Identification
D: Audio, video fingerprints
M: Matching to opening sequences, promos, commercials
O: Other Info (Program Guide, Text)
S2: search reports on content DB

```
Video Report DataStruct {
time, frameType, transitionType }

Similarity DataStruct {
time, offset, simscore }

Audio Report DataStruct {
time, audioSilence, audioLevel}

Search Result DataStruct {
time, lengthMatch, numUniquePrograms, numMatches, matchType}

Logo_State DataStruct {
time, LogoDetect, logoId }
```

Fig. 4A

```
Video Report DataStruct {
time, frameType, transitionType }

Similarity DataStruct {
time, offset, simscore }

Audio File DataStruct {
time, audioSilence, audioLevel}

Similarity_State DataStruct { time1, matchType, simscore}

Logo_State DataStruct { time,
LogoDetect, logoId }
```

Fig. 4B

```
<menu>
  <display_time>60</display_time>
  <display_title>Welcome to the program</display_time>
  <display_content>Some text/html/media content</display_content>
  <display_life>240</display_life>
</menu>
<menu>
  <display_time>300</display_time>
  <display_title>Know more about the program</display_time>
  <display_content>Some text/html/media content</display_content>
  <display_life>900</display_life>
</menu>
```

Fig. 9C

TV CONTENT SEGMENTATION, CATEGORIZATION AND IDENTIFICATION AND TIME-ALIGNED APPLICATIONS

This application claims the benefit of U.S. Provisional Patent Application Ser. No. 61/423,205 entitled "TV Content Segmentation, Categorization and Identification and Time-Aligned Applications" filed on Dec. 15, 2010 which is hereby incorporated by reference in its entirety.

CROSS REFERENCE TO RELATED APPLICATIONS

U.S. application Ser. No. 12/141,337 filed on Jun. 18, 2009 entitled "Method and Apparatus for Multi-dimensional Content Search and Video Identification", U.S. application Ser. No. 12/141,163 filed on Jun. 18, 2008 entitled "Methods and Apparatus for Providing a Scalable Identification of Digital Video Sequences", U.S. patent application Ser. No. 12/772,566 filed on May 3, 2010 entitled "Media Fingerprinting and Identification System", U.S. application Ser. No. 12/788,796 filed on May 27, 2010 entitled "Multi-Media Content Identification Using Multi-Level Content Signature Correlation and Fast Similarity Search", U.S. application Ser. No. 13/102,479 filed on May 6, 2011 entitled "Scalable, Adaptable, and Manageable System for Multimedia Identification", and U.S. application Ser. No. 13/276,110 filed on Oct. 18, 2011 entitled "Distributed and Tiered Architecture for Content Search and Content Monitoring".

FIELD OF THE INVENTION

The present invention generally relates to techniques for video and audio multi-media processing shared between a central server and remote client devices and more specifically to techniques for multi-media content segmentation, classification, monitoring, publishing in time-aligned broadcast applications, and usability for content viewing and interaction.

BACKGROUND OF THE INVENTION

Video content segmentation, categorization and identification can be applied to a number of major application areas. The major application areas are broadcast content indexing, and monitoring broadcast content.

A number of applications utilize video segmentation and content identification. Also, a number of techniques to detect commercials within broadcast content use feature detectors and a decision tree, also considered a form of classifier. Such techniques are generally performed after a show is recorded.

Traditional content identification applications such as audience measurement, broadcast monitoring, play out verification are currently limited to a lower scale of deployment for a limited number of clients. For monitoring of large scale deployments, there is a need to perform monitoring tasks with higher efficiency.

SUMMARY OF THE INVENTION

In one or more of its several aspects, the present invention recognizes and addresses problems such as those described above. To such ends, an embodiment of the invention addresses a method for time aligned identification of segments of multimedia content on a client device. Multimedia content of broadcast multimedia data received on a client device is identified. A time alignment of content playing on the client device relative to the received broadcast content is tracked and refined. A change in multimedia content has occurred and the time of the change are identified. A sample of the multimedia content beginning at the time of the change in multimedia content is verified to match an expected multimedia content, wherein a time aligned service is provided beginning at the time of change in multimedia content.

Another embodiment of the invention addresses a method of video segmentation. Fingerprints of incoming video are generated. A reference database is searched to identify content of the incoming video. Segments are associated with classification scores generated based on the incoming video content using search reports and content analytics, wherein the content classification scores represent types of content contained in the incoming video.

Another embodiment of the invention addresses a method of video segmentation based on graph based partitioning. Fingerprints of incoming multimedia content are generated. Nodes in a graph are identified, wherein each node represents a change in multimedia content and the point in time the change occurred in the multimedia content. A weight value associated with each edge between the nodes is generated based on similarity scores between different nodes in the graph. The graph is partitioned into segments. The segments are classified according to types of content contained in segments.

Another embodiment of the invention addresses a method of providing time aligned services. An incoming video stream is processed to identify content. Third party alternative content is received for selected display by a user. A scene change is determined to have occurred in the identified content, wherein replaceable content is detected at the scene change. The replaceable content detected at the scene change is replaced with the third party alternative content selected by the user.

Another embodiment of the invention addresses a computer readable non-transitory medium encoded with computer readable program data and code for operating a system. An incoming video stream is processed to identify content. Third party alternative content is received for selected display by a user. A scene change is determined to have occurred in the identified content, wherein replaceable content is detected at the scene change. The replaceable content detected at the scene change is replaced with the third party alternative content selected by the user.

These and other features, aspects, techniques and advantages of the present invention will be apparent to those skilled in the art from the following detailed description, taken together with the accompanying drawings and claims.

BRIEF DESCRIPTION OF DRAWINGS

FIG. 4A illustrates the data structures used to store the reports from fingerprint tools and from search servers;

FIG. 4B illustrates the data structures used for non-recorded broadcast content;

FIG. 9C illustrates an example partial xml showing two menu options;

DETAILED DESCRIPTION

Figure 1:
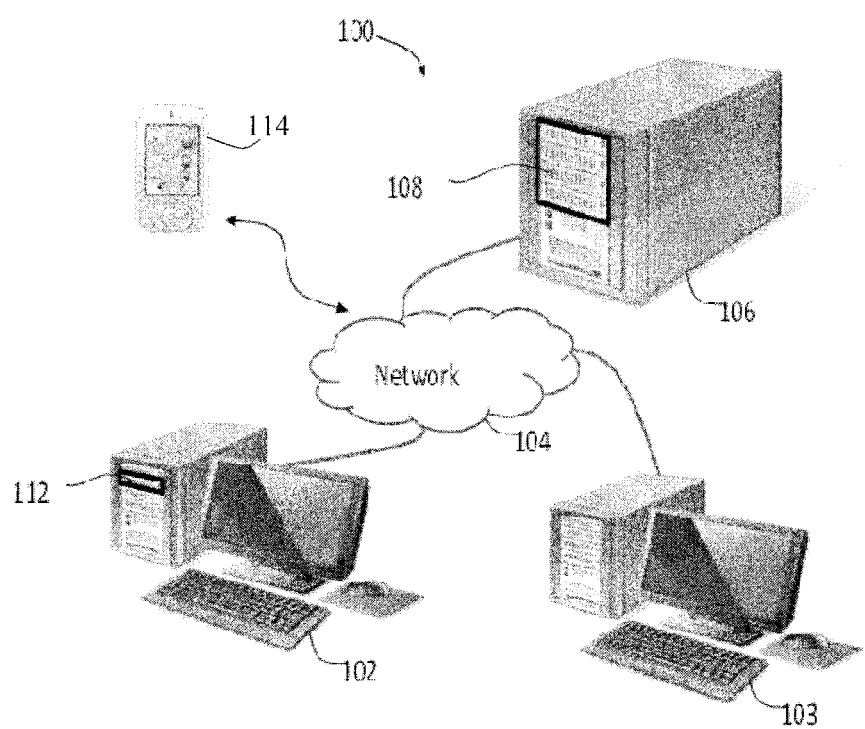
FIG. 1 illustrates a fingerprinting and search system for both media fingerprinting and identification in accordance with an embodiment of the present invention.

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

A prior art segmentation system is described in a paper "Recognizing Commercials in Real-Time using Three Visual Descriptors and a Decision-Tree", by Ronald Glasberg, Cengiz Tas, and Thomas Sikora, at ICME 2006 pages 1481-1484. The Glasberg et al. reference uses a hard cut, a static area (SArea), and a separating block (SBlock) descriptors. The hard cut descriptor is generated from the appearance of several monochrome black frames between each commercial block. In this context Lienhart et al. in "On the Detection and Recognition of Television Commercials", IEEE Conference on Multimedia Computing and Systems, pp. 509-516, 1997, published an approach, requiring that the average and the standard deviation intensity values of the pixels in these frames should be below a certain threshold. The SBlock descriptor, which analyses sub-images of a frame and the time-distance between the blocks, and helps reduce false detection during a fade. The SArea descriptor detects the presence of a logo. The recognition of logos is typically computationally expensive. The above reference uses a fast algorithm to detect the presence of a transparent or non-transparent logo. The visual descriptors are combined and a decision tree used to segment a video into commercial and content sections.

Prior art and other work in video segmentation, such as Glasberg et al., have focused on using black frames to separate commercials and specific improvements to reduce false detection. However, in many countries including the USA, black frame breaks for commercials are infrequent. Additional characteristics of channels that cause difficulties include channels that do not insert a logo, and a significant number of other channels that have a temporally varying logo. Additionally, current approaches address segmentation of content that is already recorded, and not during a live broadcast. In embodiments of the present invention, new methods are defined for accurate segmentation using content similarity, and content database searches. Techniques as described herein address large scale deployment of segmentation for applications such as time-aligned services which include specific services such as language subtitles, specific advertisement replacement or overlay, identifying new advertisements that are on broadcast channels, as described in more detail below.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer readable storage medium having non-transitory computer usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Python, Ruby, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module executed by a processor, or in a combination of the two. A software module may reside as non-transitory signals in RAM memory, flash memory, ROM memory, EPROM memory, EEPROM memory, registers, hard disk, a removable disk, a CD-ROM, or any other form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor.

Embodiments of the present invention go beyond segmentation of commercials on digital video recorder discs (DVDs) and address segmentation of broadcast content and live broadcast content into individual advertisements. Additional embodiments are described that enable quick detection of new advertisements appearing in broadcast content using the advantageous segmentation techniques described below.

Segmentation, as described herein, has also been utilized to improve identification and support time-aligned applications.

The embodiments of the invention provides a method to identify and segment video content that is playing on a consumer device or sensed ambiently. Further embodiments include methods to track the content accurately in time at client site or device and methods to provide time-aligned services. The methods are based on a collection of detectors and descriptors, a content identification system, a tracking search method, and a classification and identification method, and a few additional modes to intelligently control the overall system solution.

Also, applications related to social networking, entertainment (content publishing) and advertising can take advantage of identification of the precise multimedia program and the program's exact time as it is played on a consumer device. Such time aligned knowledge enables useful services and solutions for the user and are valuable to advertisers and content owners as well. Such applications take advantage of segmentation and identification, along with other methods such as content tracking to enable time aligned applications for broadcast content playing on consumer devices or sensed ambiently.

An embodiment of the invention addresses techniques for time-aligned services that utilize tracking when a match between incoming video and a stored content sequence is detected. The time aligned services technique allows a user to select displays of relevant content and results of metadata matching to a detected content's time and user menu choices. A content specific menu is prepared for the user to make selections from, such as content type and information. A user interface allows time scrolling to allow the user to go back into the program for missed information.

To provide for such needs, FIG. 1 illustrates a fingerprinting and search system 100 for both media fingerprinting and identification in accordance with an embodiment of the present invention. The fingerprinting and search system 100 includes user sites 102 and 103, a server 106, a video database 108, a remote user device 114 with a wireless connection to the server 106 and for example to a video fingerprinting and video identification process 112 operated, for example, by user site 102. The remote user device 114 is representative a plurality of remote user devices which may operate as described in accordance with embodiments of the present invention. A network 104, such as the Internet, a wireless network, or a private network, connects sites 102 and 103 and server 106. Each of the user sites, 102 and 103, remote user device 114, and server 106 may include a processor complex having one or more processors, having internal program storage and local user controls such as a monitor, a keyboard, a mouse, a printer, and may include other input or output devices, such as an external file storage device and communication interfaces.

The user site 102 may comprise, for example, a personal computer, a laptop computer, a tablet computer, or the like equipped with programs and interfaces to support data input and output and video fingerprinting and search monitoring that may be implemented both automatically and manually. The user site 102, for example, may store programs, such as the video fingerprinting and search process, 112 which is an implementation of a content based video identification process of the present invention. The user site 102 may also have access to such programs through electronic media, such as may be downloaded over the Internet from an external server, accessed through a universal serial bus (USB) port from flash memory, accessed from disk media of various types, or the like. The fingerprinting and search system 100 may also suitably include more servers and user sites than shown in FIG. 1. Also, multiple user sites each operating an instantiated copy or version of the video fingerprinting and search process 112 may be connected directly to the server 106 while other user sites may be indirectly connected to it over the network 104.

User sites 102 and 103 and remote user device 114 may generate user video content which is uploaded over the Internet 104 to a server 106 for storage in the video database 108. The user sites 102 and 103 and remote user device 114, for example, may also operate a video fingerprinting and video identification process 112 to generate fingerprints and search for video content in the video database 108. The video fingerprinting and video identification process 112 in FIG. 1A is scalable and utilizes highly accurate video fingerprinting and identification technology as described in more detail below. The process 112 is operable to check unknown video content against a database of previously fingerprinted video content, which is considered an accurate or "golden" database. The video fingerprinting and video identification process 112 is different in a number of aspects from commonly deployed processes. For example, the process 112 extracts features from the video itself rather than modifying the video. The video fingerprinting and video identification process 112 allows the server 106 to configure a "golden" database specific to its business requirements. For example, general multimedia content may be filtered according to a set of guidelines for acceptable multimedia content that may be stored on the business system. The user site 102 that is configured to connect with the network 104, uses the video fingerprinting and search process 112 to compare local video streams against a previously generated database of signatures in the video database 108.

The video database 108 may store video archives, as well as data related to video content stored in the video database 108. The video database 108 also may store a plurality of video fingerprints that have been adapted for use as described herein and in accordance with the present invention. It is noted that depending on the size of an installation, the functions of the video fingerprinting and search process 112 and the management of the video database 108 may be combined in a single processor system, such as user site 102 or server 106, and may operate as directed by separate program threads for each function.

The fingerprinting and search system 100 for both media fingerprinting and identification is readily scalable to very large multimedia databases, has high accuracy in finding a correct clip, has a low probability of misidentifying a wrong clip, and is robust to many types of distortion. The fingerprinting and search system 100 uses one or more fingerprints for a unit of multimedia content that are composed of a number of compact signatures, including cluster keys and associated metadata. The compact signatures and cluster keys are constructed to be easily searchable when scaling to a large database of multimedia fingerprints. The multimedia content is also represented by many signatures that relate to various aspects of the multimedia content that are relatively independent from each other. Such an approach allows the system to be robust to distortion of the multimedia content even when only small portions of the multimedia content are available.

Embodiments of this invention address accurate classification of queries. By accurately classifying query content, a classified query can be correctly directed to relevant search servers and avoid a large search operation that generally would involve a majority of database servers. Further embodiments of this invention address systems and methods for accurate content identification. As addressed in more detail below, searching, content monitoring, and content tracking applications may be distributed to literally million of remote devices, such as tablets, laptops, smart phones, and the like. Content monitoring comprises continuous identification of content on one or more channels or sources. Content tracking comprises continued identification of an already identified content without performing search on the entire database. For example, a television program may be identified by comparing a queried content with content already identified, such as television programs and primarily with the anticipated time location of the program as described in more detail below. This is in contrast to a number of current solutions that involve a large number of database servers for such applications.

Figure 2A:
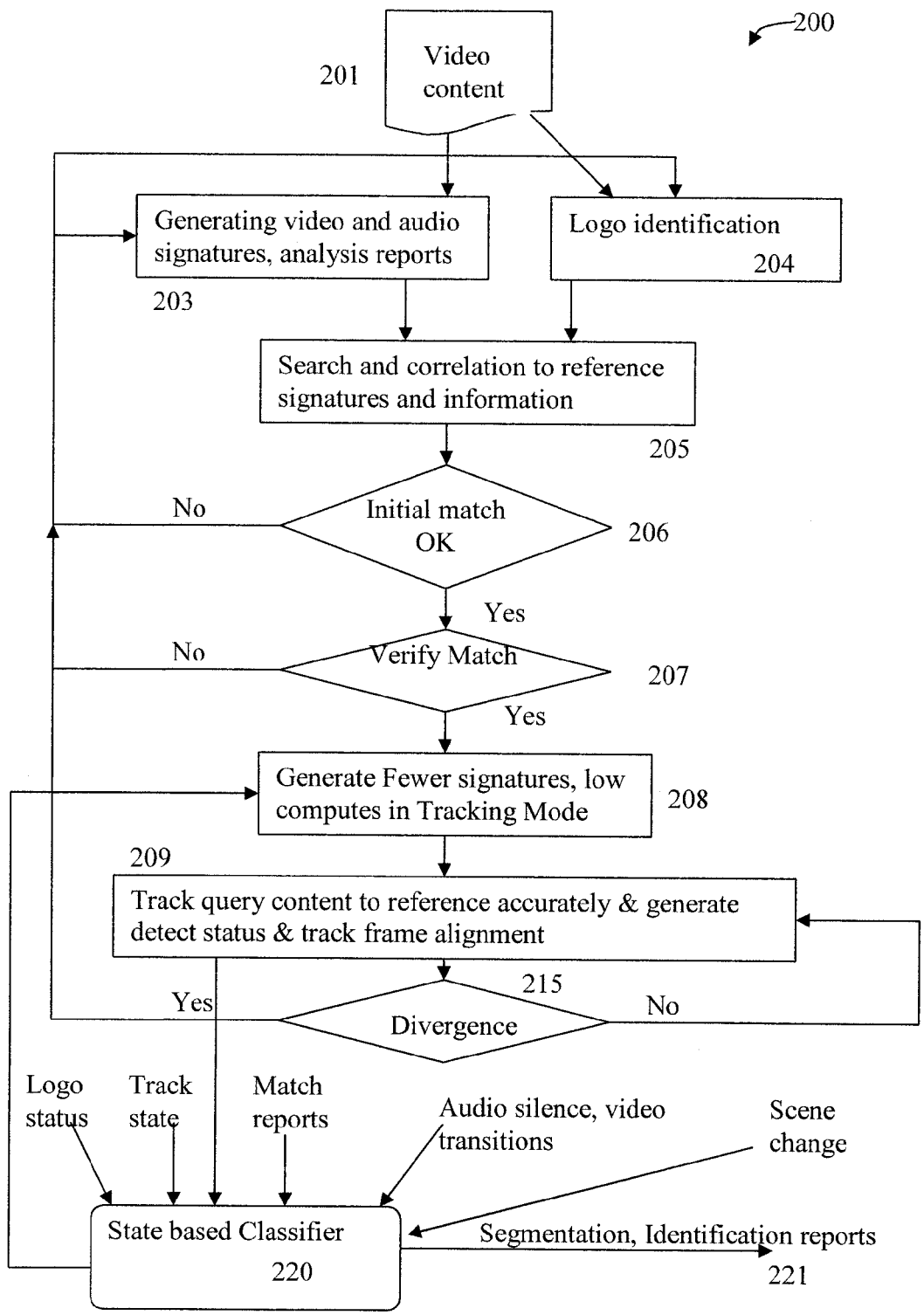
FIG. 2A illustrates with a flowchart an embodiment of the invention using content id matching, logo tracking, and video transition detection and audio silence detection to perform video segmentation.

FIG. 2A illustrates with flowchart process 200 an embodiment of the invention to segment video and to identify content segments accurately using content id matching, logo tracking, scene change detection, and video transitions and audio silence and audio turn detection. The process 200 is operable to run on a client device or a supporting server.

The client or monitoring device can be a consumer device/studio/broadcast equipment configured to perform fingerprinting, scene change detection, logo detection, and commercial break cues detection on incoming content received directly or sensed ambiently in order to segment and track the incoming content. The client device, transitions between different states based on the content identified and activates specific detectors based on its state. The client device utilizes fingerprints, content search, and processing of sensed audio and video to identify and segment the incoming video content. To identify content the client performs a similarity search and correlation against stored video and audio sequences. The client performs content tracking and segmentation of content to enable a variety of applications. For example, applications may be provided for the purpose of separating content from advertisements and monitoring of advertisements, in order to identify and separate out new advertisements. Also, applications may be provided to accurately track content and to identify, for example, advertisements and promotions accurately in time to enable time-aligned services.

The client or monitoring device can be a consumer device/studio/broadcast equipment configured to perform fingerprinting, scene change detection, logo detection, and commercial break cues detection on incoming content received directly or sensed ambiently in order to segment and track the incoming content. The client device, transitions between different states based on the content identified and activates specific detectors based on its state. The client device utilizes fingerprints, content search, and processing of sensed audio and video to identify and segment the incoming video content. To identify content the client performs a similarity search and correlation against stored video and audio sequences. The client performs content tracking and segmentation of content to enable a variety of applications. For example, applications may be provided for the purpose of separating content from advertisements and monitoring of advertisements, in order to identify and separate out new advertisements. Also, applications may be provided to accurately track content and to identify, for example, advertisements and promotions accurately in time to enable time-aligned services.

The method is used on central server for archiving and monitoring applications, and on the remote clients, such as smart TVs, tablets, computers, smart phones, and the like, for time aligned and monitoring applications.

The method avoids reliance on logo and black frames detection, and uses other detectors and features to segment broadcast video. While logo detection is used in methods such as tracking a known content or narrowing a query, to segment video the reliance on logo detection is reduced. The client performs content tracking and segmentation of content to enable applications for separating content from advertisements and monitoring of advertisements, quickly identifying and separating out new advertisements, or determining more accurate time identification of content for time-aligned services.

Figure 3:
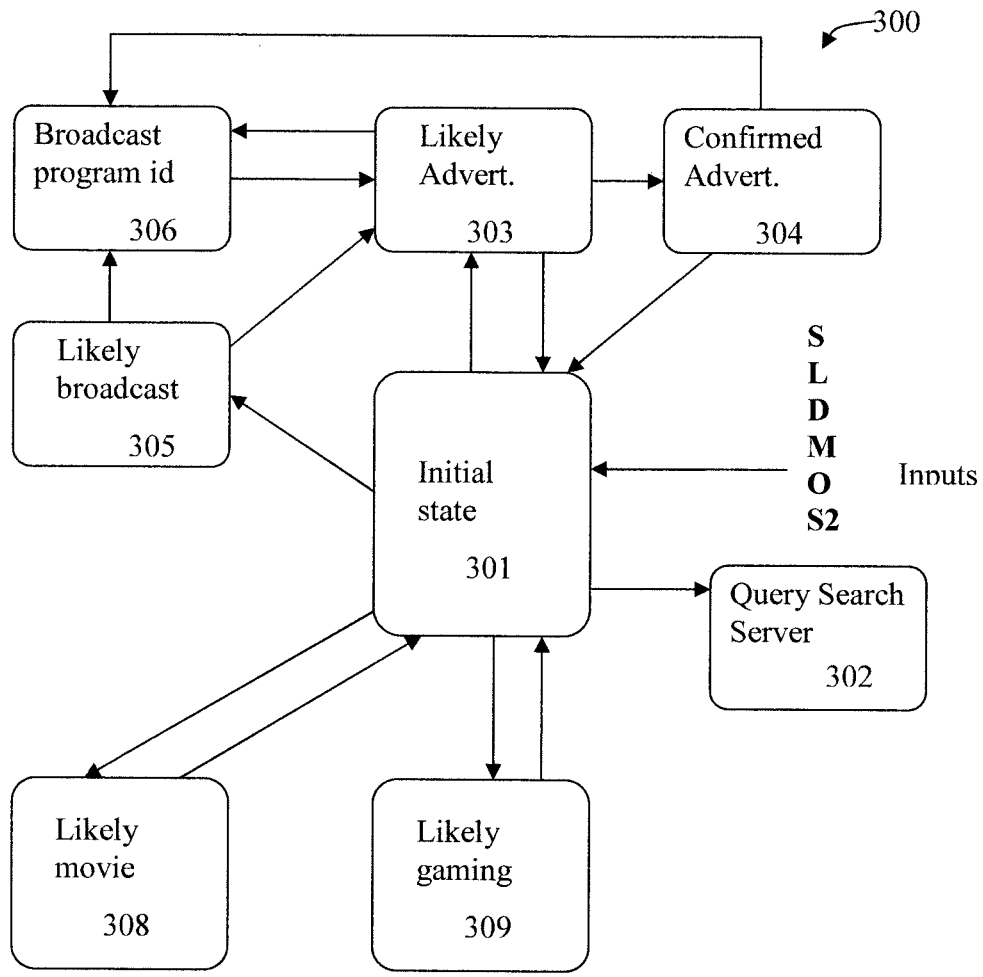
FIG. 3 illustrates a flowchart showing the states of detected content and state transitions for video segmentation.

A method, as shown in FIG. 3 and described in more detail below, uses classification and state based segmentation that is effective for live broadcast content to identify content, advertisements and promos quickly.

In FIG. 2A, the incoming video 201 is processed at step 203 to generate fingerprints for the video. The terms fingerprint and signature may be used interchangeably. The step 203 also generates reports using audio and video analysis. Step 204 performs, in parallel with step 203, logo detection, identification and tracking. At step 205, a search is performed on the database of all collected content and advertisements, to identify the content and the time location of the content. Configurations for implementation of step 205 can vary based on the device performing this function. Examples of devices performing these operations are smart TVs, tablets, and smart phones or central server. As a result of the search, an initial match is detected and evaluated in step 206. At step 207, the match is verified using more information and signatures such as additional fingerprints, logo information, color descriptors, scene changes. If there is no match, the process 200 returns to steps 203 and then 205 to identify content. If there is a match, the process 200 proceeds to step 208. At step 208, video frame transformation and audio transformation are calculated. The step 208 detects the transformation of the reference content to the content on the client. Transformations possible are cropping of video frames, zooming in, change in image ratios along x or y axis, and image brightness and contrast changes. Similarly changes can occur for the audio, and these can be pitch change, frequency response changes. The presence of these changes increases the compute effort to fingerprint and detect the reference content. By detecting the type of transformation of the original content to the content played at a client site, most of the negative impact of these transformations may be reduced thereby reducing the computational effort to identify the media content and increasing accuracy of the identification. Thus, the transforms are utilized to optimizes the compute cycles used to generate fingerprints.

Now step 208 can use the transformed query video and audio, so as to represent original video and audio fingerprints more closely, and thus more likely to better match the reference fingerprint. For example, by detecting client content that has been stretched 20% on the y-axis, that information is taken into account in the generation of fingerprint to obtain a more accurate representation of the client content. Other distortions, such as may affect x position, y position, scale in video and peak coefficient information, frequency entropy in audio, and other such distortions, may be detected and likewise taken into account to improve accuracy. Step 208, generates the fingerprints and reports to track the monitored content with reference to the original reference (via fingerprints). Query content is transformed to represent the original aligned content. If the query video is cropped, than the query transform considers this, so that the generated fingerprint better represents the original. At step 209, a correlation between the generated transform fingerprints and the reference is performed to achieve accurate matching between monitored content and reference. If the tracked content no longer matches reference, it is considered a divergence and is detected at step 215. If divergence is detected, the control loops back to 203, and 204 for fingerprinting and logo processing, and identifying content. Since the previous content no longer matches, at step 203 the content is identified again, and this next time may match a different program or video.

At step 220, a state based classifier takes in all the reports from the fingerprint tools, and the database search, detected logos and other information generated in steps 203, 204, 205 and 209. The classifier analyzes these reports and generates a higher level of classification: such as advertisements, identified content, and promotions and a finer level of segmentation which identifies individual advertisements, and chapters of the content. FIG. 3 illustrates a state based classifier described in more detail below. Promotions are content that advertises video programs yet to be broadcast, or other content that is not an advertisement and not a video program. The results of segmentation process 200 include the following: (i) separate content and index of the content for archival purposes, (ii) information to identify and monitor advertisements, (iii) information to identify new advertising, (iv) information to classify a video during live broadcast to reduce cost of content tracking and monitoring, and (v) information to classify live content for synchronous time aligned services.

In an alternate embodiment, the classification of video can be performed using a graph structure, where each node is a point in time of the video content, and the arcs between the nodes are similarity scores between the nodes, while other information (such as logo detect, audio turns, scene change, database search) are used to generate the classification into advertisement or content or other types.

Figure 2B:
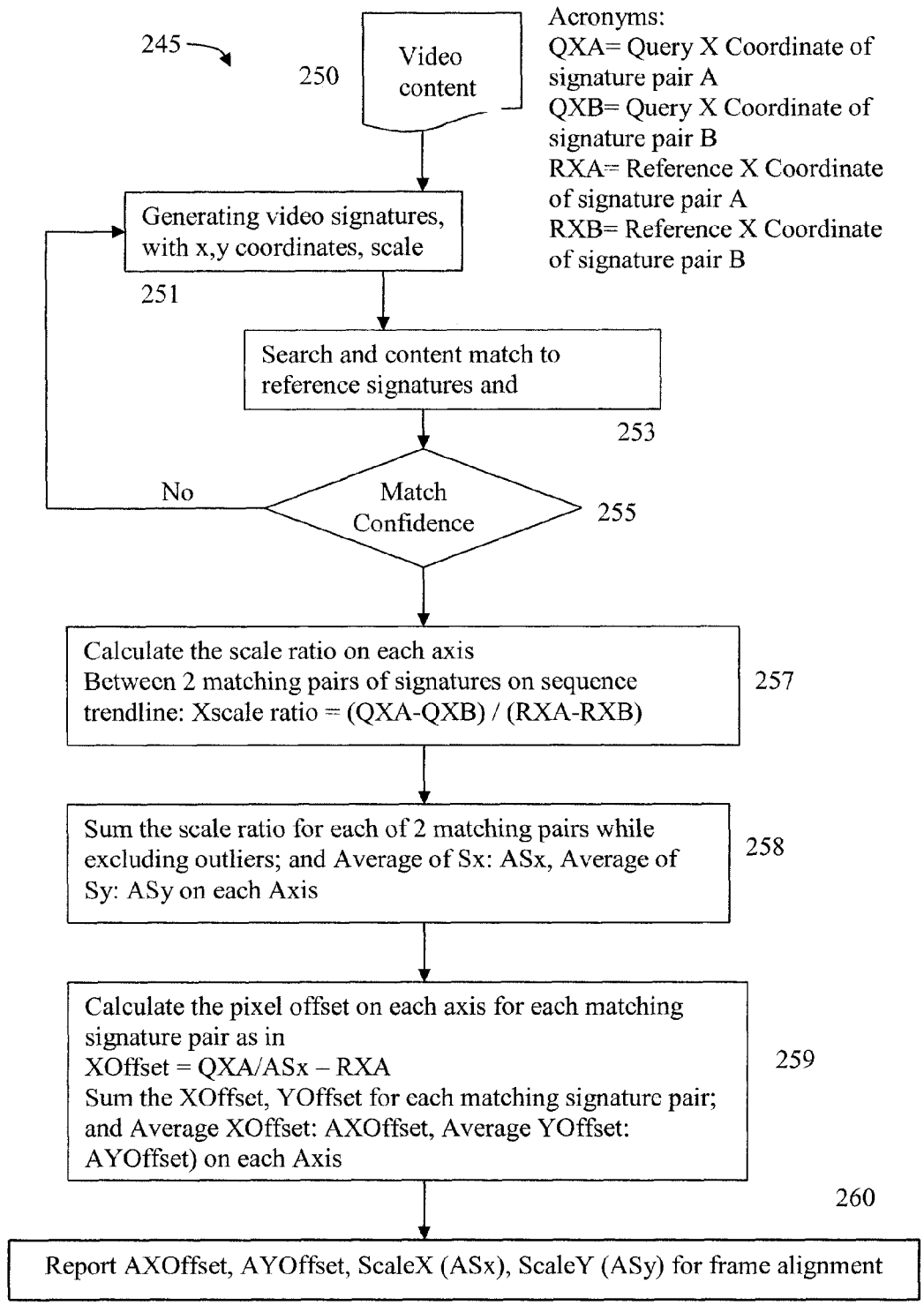
FIG. 2B illustrates a flowchart to detect frame alignment between query video frames and reference video frames.

FIG. 2B illustrates a method 245 to detect a frame alignment mapping between a query and a reference video. The process 245 is operable to run on a client device or a supporting server. By detecting frame alignment between client video frames and reference video frames, the system efficiency is improved. The detected frame alignment can be used to reduce fingerprint compute cost since the client video frames can now be aligned with reference frames. By detecting the alignment between the frames, any distortion or disturbance between the reference and query fingerprint can be avoided resulting in high matching accuracy or reducing the fingerprints to be compared. The transformed query video and audio represent original video and audio fingerprints more closely, and thus more likely to better match the reference fingerprint.

By detecting the alignment between the frames the distortion (disturbance) between the reference and query fingerprint can be avoided resulting in high matching accuracy or reducing the fingerprints to be compared.

Detecting frame alignment enables applications that perform overlays of text and specific images without unintended effects since the overlay can be selected to be at appropriate locations on video screen image. Applications such as multi-language broadcast, advertising, subtitles, or $3^{rd}$ party content overlays can be performed accurately.

Detecting frame alignment enables applications where text and specific image overlays can be performed without unintended effects since the overlay can be selected to be at appropriate and accurate locations in position and in time on video screen image. Applications such as multi-language broadcast, advertising, subtitles, or $3^{rd}$ party content overlay can be performed correctly.

For embedded applications involving time-aligned applications, the detected video and audio transforms on the consumer device are used on the consumer device to reduce the cost of fingerprinting by reducing content variation while tracking the identified content. The transformed query video and audio represent original video and audio fingerprints more closely, and thus more likely to better match the reference fingerprint.

The video content is received at step 250. Next at step 251, video signatures are generated that include the detected or selected region's location or equivalent coordinate information and scale. A region may be determined, and thereby selected, and a location of the determined region provided. In one aspect, frame alignment is performed using scale or size of a selected region and x and y coordinates of a fingerprint descriptor center. At step 253, a search and content match process is performed to detect for a match between the query which is the incoming video received at step 250 and reference database. For example, the reference database may be located on a central server or at a client device. At step 255, the same content match process evaluates the confidence of the match. One method of estimating confidence of the match includes using a geometric correlation between the scale and x, y coordinates of the fingerprints. If a reliable, as determined by the confidence, match is not detected, the query is generated once again returning to step 251 for signature generation. If a reliable match is not found, another search is processed to in an attempt to obtain a match with good confidence before making assumptions about video frame alignment. The intent is to have as correct a match as possible, before making an estimate of the geometric alignment between the query and reference video frames. If a reliable match is detected, the process 245 proceeds to step 257. Step 257 involves calculating a scale ratio on each X-axis and Y-axis between 2 pairs of matching query and reference signatures by obtaining the geometric x, and y coordinate difference between the query signature pair and the reference signature pair along each axis. With video fingerprinting, regions of a video frame are selected for a fingerprint. The center of each region fingerprinted can be described with x, y coordinate. The size of the region is described using the scale value.

The scale ratio along the X-axis for 2 pairs of matching signatures is calculated as:

$$X\text{scale Ratio}=(QA(x)-QB(x))/(RA(x)-RB(x)) \qquad \text{eqn (1)}$$

where QA(x) is x coordinate of Query, RA(x) is x coordinates of Reference of a matching signature pair A; and similarly for signature pair B.

In another embodiment, an additional condition can be used to select or prefer pairs of fingerprints that agree geometrically, and in this alternate embodiment only pairs which have center coordinate difference greater than a threshold are considered. The scale ratio on the x-axis is denoted as Sx, and that on the y axis as Sy.

Returning to step 258, the average scale ratios ASx, ASy on each axis are calculated. Outliers, are those pairs that have high geometric alignment error and are eliminated while calculating this average. At step 259, the pixel offset between the query and the reference video frames are calculated. For each matching pair the pixel offset is calculated with the following equation $$XOffset = QA(x)/ASx - RA(x) \quad \text{eqn (2)}$$

where QA(x) and RA(x) are the x coordinates for a matching signature pair, and ASx is the average scale ratio on the x axis as calculated in equation (1). The evaluated frame alignment information between query and reference video is reported at step 260. The reported frame alignment information includes pixel or equivalent offsets along x-axis and y-axis, and the scale ratios on the x-axis and y-axis. With this information, it is possible to map the location of the query video frame to exact pixel locations on the reference video. The frame alignment information is used to generate transformed query video and audio fingerprints represent original video and audio fingerprints more closely, and thus more likely to better match the reference fingerprint. Since the query signatures generated using frame alignment more accurately represent the reference, fewer query signatures may be used to determine a continued match of the incoming video broadcast at the consumer device with the reference. The detected frame alignment is also very useful to align any overlay text or image in various applications that are described further.

Figure 2C:
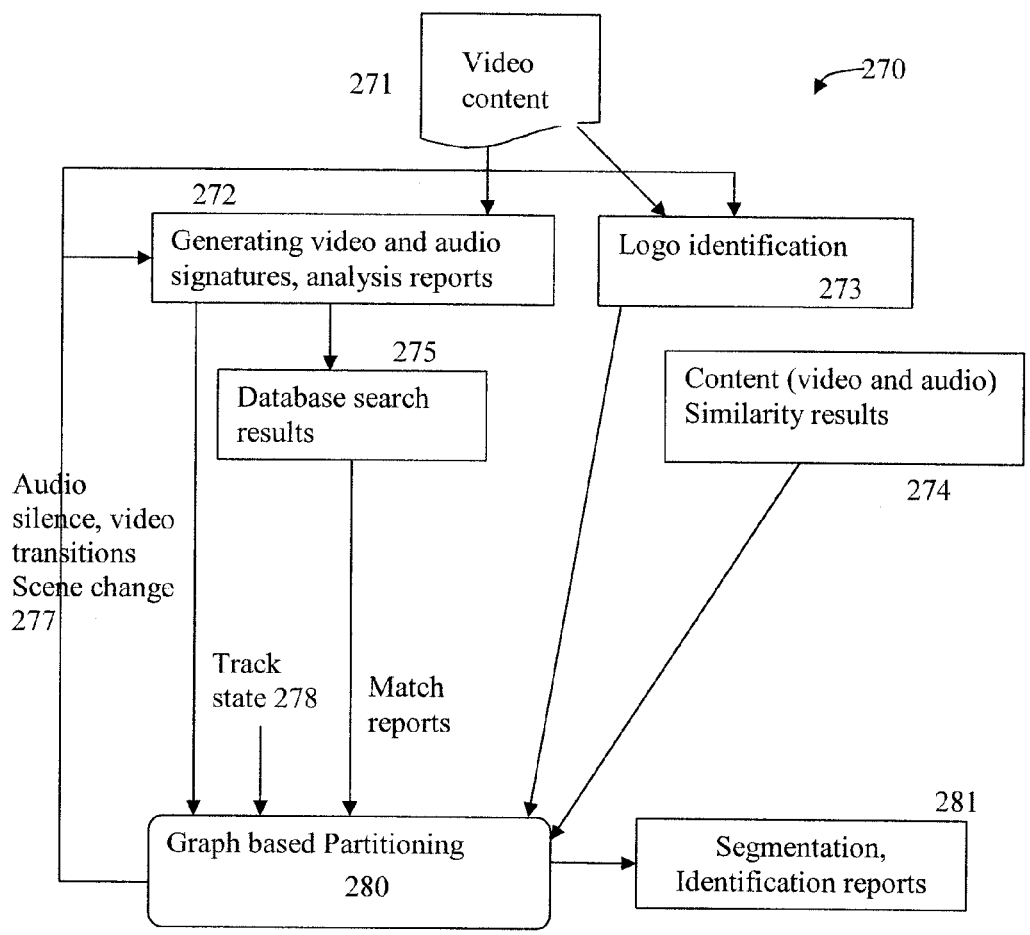
FIG. 2C illustrates a flowchart to perform video segmentation using graph.

FIG. 2C illustrates a method 270 of video segmentation using graph based partitioning. A unique embodiment of a graph segmentation method is use of edge weights defined to represent the similarity between content nodes that represent a unique content time. Each node is associated with a likely class based on processed reports, including content search results, blank video and scene change reports, and audio silence and turn reports. The graph segmentation method is able to combine both local content similarity with the global similarities in the program content, to assist in segmentation. The graph segmentation method uses content matching results with a large database to assist in classification and segmentation.

This method 270 combines both local in time similarity to global similarities and in the program content using large content databases to assist in segmentation. A database search is performed to indicate what kind of content is being evaluated. If the content is an advertisement, it is likely to match an advertisement from the main database. If the content is an actual video program, it may at least match an opening sequence or closing credits if the program is a continuation of an existing TV or video program series.

In additional to evaluating the audio and video content properties, content search is utilized on acquired databases of content, advertisements, promotions, opening sequences, closing credits to assist in accurate segmentation of the video content. Each node, as defined below, is given a class score based on audio, video processed reports and database search.

A graph G (V,E) consists of nodes $v_i \in V$, and each $(v_i, v_j) \in E$. Each node $v_i$ is selected at audio and video turns and specific time intervals. Each edge $(v_i, v_j)$ connects certain pairs of nodes, usually neighboring time nodes, and neighboring significant nodes that are unique because of an audio or video scene change or at boundaries of content matching sequences. A node represents a point in time in the video content. The node at the selected time holds relevant information including audio signatures, video signatures, type of event, such as audio silence, an audio turn, a scene change, or just a sample. A weight is associated with each edge that is based on the similarity between the nodes.

Multiple methods are used to determine the similarity between nodes. When an audio turn or video scene change is present between two nodes, the nodes are more likely to be dissimilar so a negative value will be added to the edge weight. If the content contained at the nodes match the same reference content then a positive value is added to the edge weight since they are likely to belong to same content, but if the nodes belong to different content than a negative value is added to the weight of the edge. Comparing signatures and features from audio and video between the 2 nodes, as described in more detail below with regard to step 274 of FIG. 2C, is another method to calculate the similarity between the 2 nodes. Logo identification is a advantageous method used in television broadcast to classify content and the presence of a similar logo at two nodes, or a difference in logo status between 2 nodes is used to calculate the similarity score used for the edge weight.

Once a graph is defined with edges having similarity weights, the graph can be partitioned using any of the well known graph partitioning methods. One approach for graph segmentation is a method using pairwise region comparison, as described in "Efficient Graph-Based Image Segmentation", by P. Felzenszwalb and D. Huttenlocher, Int'l J. Computer Vision, vol. 59, no. 2, pp. 167-181, 2004).

In an embodiment of the present invention, in order to partition a graph into classified segments such as advertisement, promotions, and content, additional edge weights are added based on the likely classification. The classified content can be further segmented into individual advertisements, or content chapters.

In an embodiment of the present invention a graph cut method using pairwise region comparison calculates an edge weight between 2 regions. A low cost implementation of the edge weight may be the highest similarity score between nodes in each region, while in more robust implementations, an edge weight would be calculated between the 2 entire regions. The 2 regions can be merged if the edge similarity is greater than the average or median (or another function) of the 2 regions.

Returning to FIG. 2C and method 270, the input multimedia content is received at step 271. At step 272, the received multi-media content is used to generate audio and video fingerprints and detection of audio turns, audio silence, and video scene changes, and video blanks. Logo identification is performed at step 273. At step 275, a database search is performed using the fingerprints against a database of advertisements, promotions, and content information including opening scenes or full content. At step 274 frame similarity between different time locations of content is performed. The time locations can correspond to nodes in a constructed graph, and the time points are selected because they are significant, such as a beginning period of silence, blank video frames, an audio turn, a video scene change, or determining a content match boundary.

The results from step 275, database search, and from step 273, logo identification, and 272, audio and video event reports, and content similarity reports from step 274, are input to a graph analysis and partitioning at step 280. Graph segmentation is also performed at step 280 to generate a classified video segmentation such as advertisement, promos, and content. A finer segmentation can also be performed to identify individual advertisements, and individual content chapters. These reports are generated at step 281.

In another embodiment, new advertisements are identified using the video segmentation by graph or classification methods. Segmented advertisements that partially matched or did not match previous advertisements are identified and are considered candidates for new advertisements. With this method, new advertisements can be identified efficiently and quickly while monitoring hundreds of channels with continuous broadcast.

FIG. 3 illustrates a state transition diagram 300 of an embodiment of the state based classifier. Initially the content is unknown, so we are in an initial, unclassified state 301. The inputs at state 301, include the audio and video analysis reports: audio silence, audio turn, scene change, video blank/black frame, and initial search results are processed by the state classifier. If the classifier detects a particular type of content, it causes state transition into states such "likely advertisement state" as in state 303; when its detects content that is classified as such, likely broadcast content state 305, and likely movie in state 308. In each of the "likely" states, the inputs including further search results, and fingerprint reports are fed to the classifier. If the classifier confirms the detection of a particular category of content, the state transitions to a "confirmed" advertisement or confirmed program and other confirmed states as in states 304 and 306. If the content is unknown and meets certain rules, then a query is made to search server at state 302.

As discussed earlier in an embodiment, the fingerprinting and analytics have different modes, and their compute cost is reduced in the "likely" states. Analytics are methods to extract information, such as logos, scene changes, an the like. In the "confirmed" states, the audio and video analysis cost can be reduced even further till a change in state occurs.

FIG. 4A is an illustration of the data structures 400 to capture the video and audio analysis during fingerprinting, and search results for segmenting the video. The data structures hold data generated by audio analysis, video analysis, logo detect, content similarity and database search reports. The video report data structure holds the time of the event, the frameType, such as audio or video and transitionType, which may include blank, fade, black. The similarity search data structure holds the time, the time difference offset between compared frames, and the similarity score. The audio report data structure holds the time of the event, the audio event, such as an audio turn, silence and audioLevel. The search result data structure holds the time, length of match, number of unique matching programs, total number of matches, and the match type, including classification of database that is searched on. The logo data structure is used to identify the matching logo and holds the time, whether logo detected and the logo ID. The data structures are used to classify and segment the multimedia program by adding a classification weight or score at each time node. When graph based segmentation is used, the data structures are utilized to generate node classification and edge weights.

FIG. 4B describes the relevant data structures 450 for non-recorded broadcast which are used to segment streaming video. The data structures hold data generated by the audio analysis, video analysis, logo detect, and content similarity reports. To support live broadcast segmentation, an additional frame similarity search report is added and this holds the results of frame level content matching with client databases of opening sequences, closing credits, specific images and sound bites. A frame similarity search is performed only on detected frames at the client, and these are triggered by events such as scene change, audio turn, silence or video blanks, fading. An additional frame similarity data structure holds event time, type of match, match score.

In an embodiment for segmenting video content, a graph connecting different time points within the video is generated. The data extracted from the video and audio analysis reports and stored in the data structures are used to generate similarity scores regarding the similarity of different sections of the video. Similarity scores are also generated that represent a likelihood of content or advertisement at a particular time. Such a prediction is based on past history of previous data base content searches and the previous content of the same video. The scores are mapped onto a graph structure and the graph is segmented into sections representing content and advertisement classes, as well as into individual advertisement and content chapters.

Figure 5A:
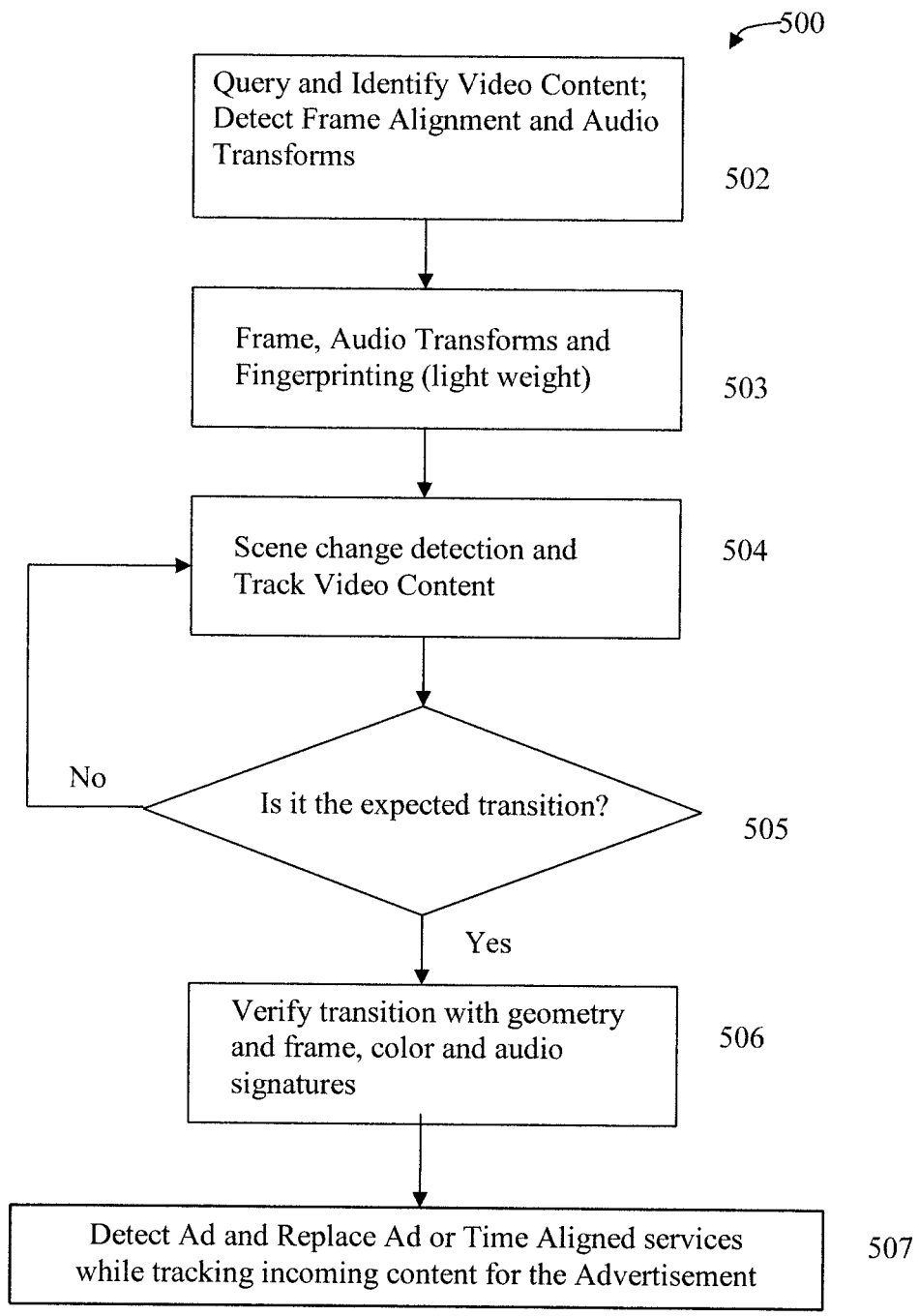
FIG. 5A illustrates a flowchart to perform fast and accurate content segmentation, and identification which can be used for time-aligned applications including advertisement replacement.

FIG. 5A illustrates a flowchart 500 to identify and track content and perform specific time-aligned application such as advertisement replacement. This includes a method of fast and accurate content segmentation, and content identification.

A video segmentation method utilizes graph partitioning or a classifier to segment or classify sections of the video content. The inputs for the classifier or graph partitioning technique are video and audio analytic reports in time, content similarity in time, and content match reports for advertisements and content with matching time information. The video and audio analytics include detection of video scene changes, including black frames, audio silence detection and audio turns, and number of active audio channels.

At step 502, a content query on a search server is performed to identify current video content playing on a selected client. The search and content match method at step 502 identifies video and audio transforms on content played out at the client, in addition to identifying the content. The detected audio and video transforms at the client include detection of the frame mapping between reference and query video frames. FIG. 2B illustrates a method for detecting frame alignment between query and reference video. At step 503, the client now performs a video and audio transform, as required to better align the client fingerprints to the reference and then generates query fingerprints. In one example, a detected transform for frame alignment is performed on query content while generating fingerprints. This step enables low compute cost and better tracking of client content to the reference in upcoming processing steps. At step 504, scene change detection is utilized on the client content to select frames to perform fingerprinting and correlate with the reference. Next, the fingerprints are used to track the client content to the reference. At step 504, client content is tracked with reference to the expected broadcast and that includes time sections where the content being played is not known such as unidentified advertisements. Processing is optimized if the expected time slot for the advertisement or content to be tracked or replaced is known. If the exact location is unknown, as may be the case with a live broadcast or a non-recorded linear broadcast, verification processing is required on all possible transitions. At step 505, on a scene change or audio transition, a check is made on whether the sampled incoming content is an appropriate transition after which the expected content is likely to play out. At step 506, the incoming content in the client buffer which may not necessarily be played out is verified with multiple fingerprint methods and determined whether any matches are found with expected content. If the tracked advertisement or content is associated with some time-aligned service, that action is performed at step 507.

Figure 5B:
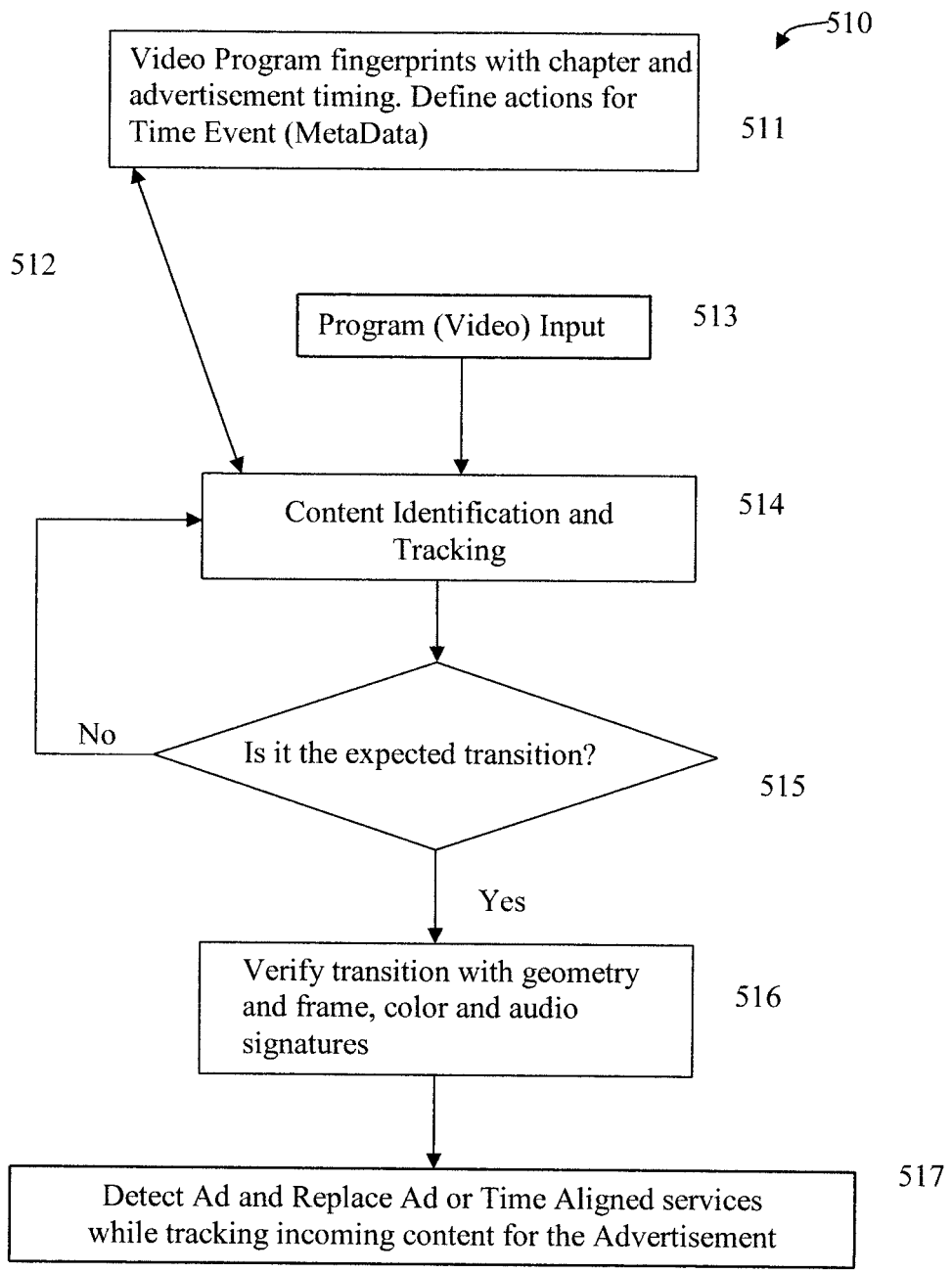
FIG. 5B illustrates a method for specific advertisement replacement or overlay.

FIG. 5B illustrates a flowchart 510 for performing advertisement replacement for a specific pre-selected and identified advertisement slot. This method is advantageous and requires specific information of an advertisement or content that needs to be replaced. One embodiment needs the specific time when the advertisement is expected to occur. Embodiments of the invention include the transition 512 to describe the content to be replaced, and the time information (known or unknown), step 516 to verify instance of occurrence via video frame, audio, or watermarks in audio or video, and the step 517 to track the original content that is incoming while the replacement content is being displayed or played at client site.

At step 511, the time location of the advertisement or specific information to be overlaid or displayed is defined for multi-media content. At step 513, the content is sampled or sensed. At step 514, a content query is performed on a search server to identify current video content playing on the client. At step 514, the client also tracks the input content fingerprints with the reference. Processing may be optimized if the expected time slot for the advertisement or content to be tracked or replaced is known. If the exact location is unknown, as may be the case with a live broadcast or a non-recorded linear broadcast, verification processing is required on all possible transitions. At step 515, on a scene change or audio transition, a check is made at to whether the sampled incoming content is an appropriate transition after which the expected content is likely to play out. At step 516, the incoming content in the client buffer which may not necessarily be played out is verified with multiple fingerprint methods and determined whether any matches are found with expected content. If the tracked advertisement or content is associated with some time-aligned service, that action is performed quickly in step 517.

Figure 5C:
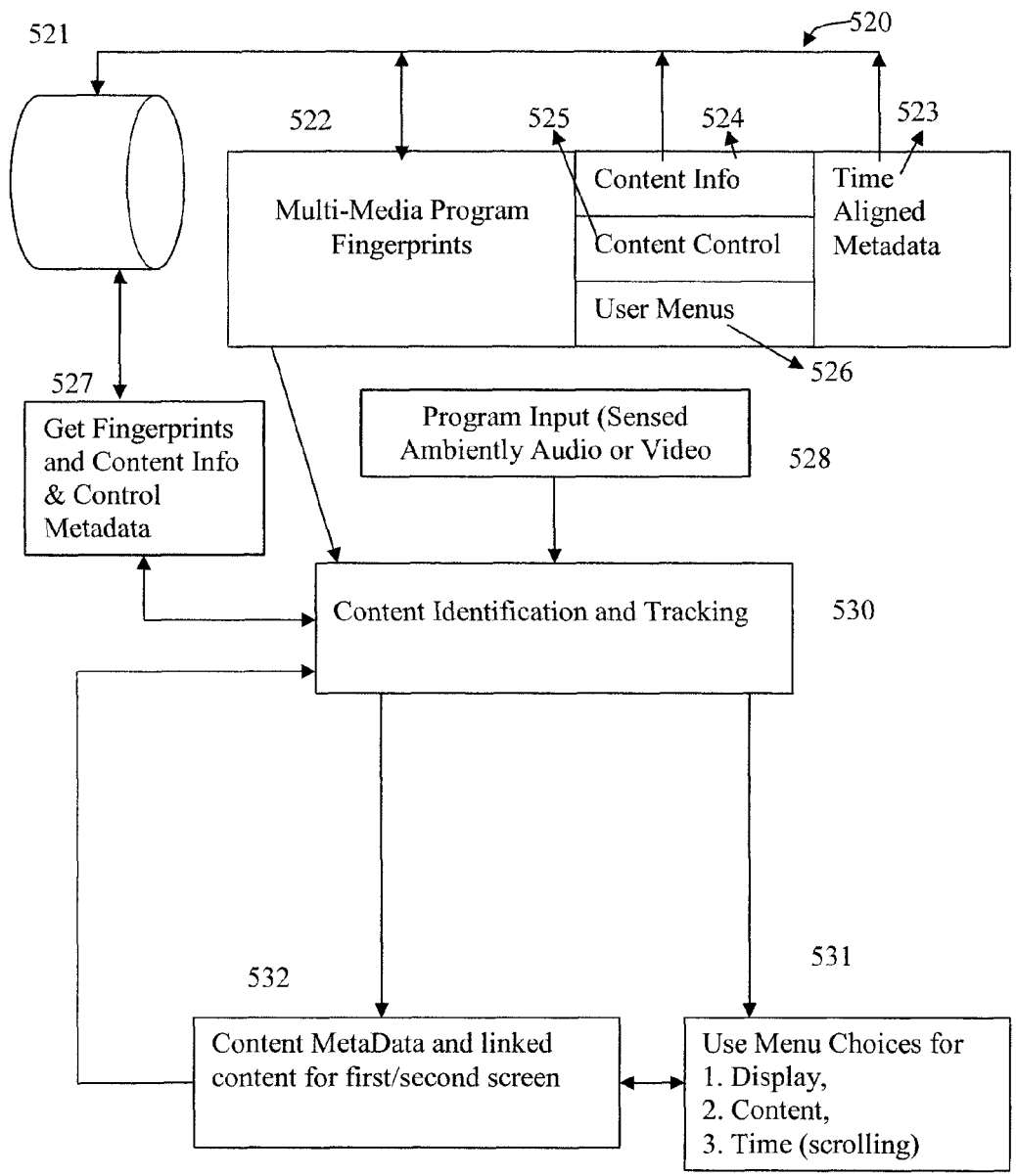
FIG. 5C illustrates a method for publishing content and metadata for first/second screen time aligned applications.

FIG. 5C illustrates a flowchart 520 to publish content and offer user interaction modes for time-aligned applications. The method of content publishing with associated content data, associated content links, content control menus, and user control menus enable an entire ecosystem of content publishing. The advantageous methods of content publishing as described herein offers a user choice of the content to be presented and supports efficient and engaging user interaction. Time-aligned services can be consumed on a separate device or screen without disturbing a first screen, such as a primary TV display. In many cases, the user may not have control or may not want to exert control especially when other viewers are watching. The methods for time-aligned services enable each user to have a private selected experience of viewing a program along with additional specific information, such player statistics, or dance steps, or local costume designers of actor apparel. The user choices can be remembered and can be different for each program. The same user may want player statistics, game scores, and standings for an NBA game, but may also want to learn dance steps while watching a network TV show "Dancing with the Stars". While watching a streaming movie, the user may want to control the first screen and place it into "family viewing mode". Such control would be possible by restricting non-family rated pieces and fetching family friendly replacements.

The reference content is processed initially to generate sequentially or in parallel fingerprints and associated data as shown in steps 522 through 525. At Step 522, fingerprints for the content are generated and stored with the timestamps in memory 521. At step 524, content information is defined, at step 525 the content control options are defined, and at step 526 the user menus to be offered are defined. At step 526, time based behavior for the metadata is defined which includes content information, content control and user menus. The memory associated with access step 521 stores the information from steps 522, 524, 523, 526, and 527. At step 528, the content is sampled or sensed. At step 530, a content query is initiated on the client device to be performed on a search server to identify current video content playing on the client, when the content is not found on client. In support of step 530, part of the database is on the client which is searched first. Also, at step 530, the client also tracks the input content fingerprints with the reference. At step 532, the content information determined from metadata and content metadata links is displayed. At step 531, the user is offered control for content viewed on one or more display screens. For example, a display screen selection, display format selection, content type selection, and time scrolling may be offered among other control options. At step 527, content, fingerprints, and control metadata are downloaded at request of the tracking function at step 530. Further, at step 530, if tracked content continues matching updated content, display and control options are provided to user. If content does not track, segmentation is used to decide the content type and also decide whether to keep looking for local match, or send a new query to search sever. At step 532, the process returns to the content identification and content tracking step 530.

Figure 6:
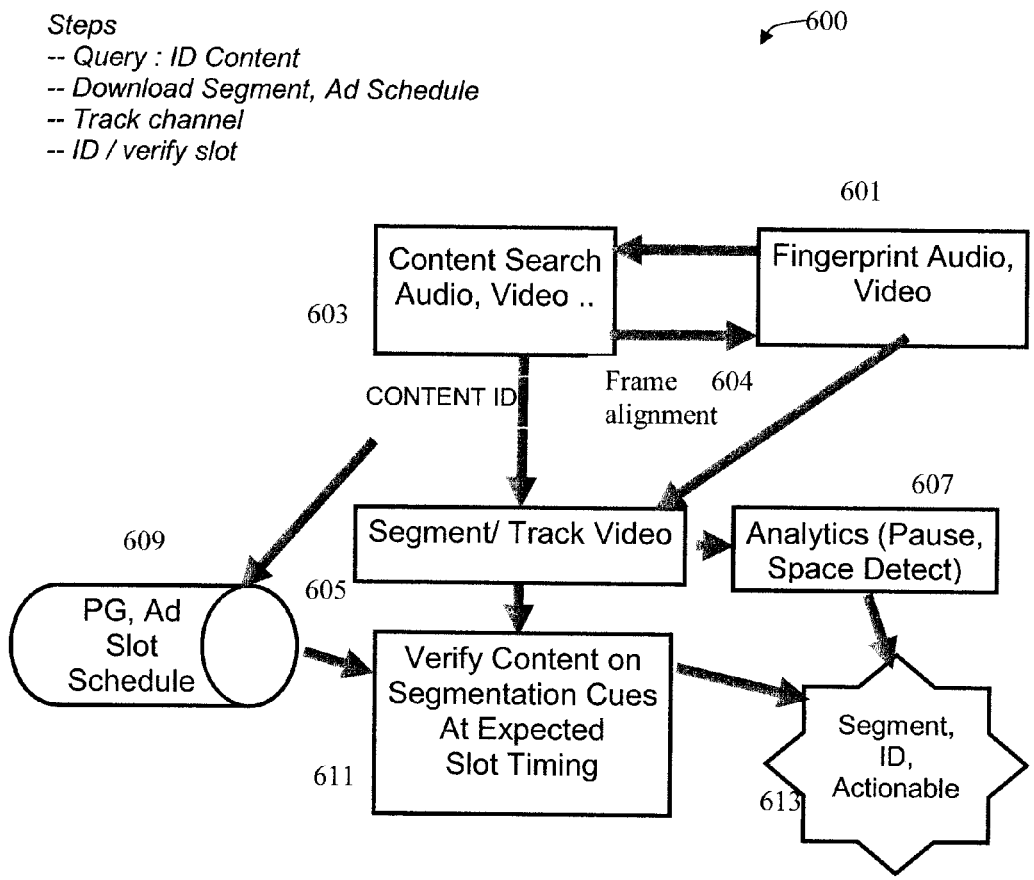
FIG. 6 illustrates a method to segment broadcast TV content on a consumer device and offer time aligned services.

FIG. 6 illustrates a method 600 to segment broadcast TV content, and provide time-aligned services. Step 601 performs fingerprinting and content analysis of broadcast content. Step 601 transmits the fingerprints of each recording such as a TV program as a query to the content search at step 603. A content search server at step 603 returns a search report containing the detected match data to step 605. At step 604, the content search server transfers the information about the video frame alignment between the reference and query to the fingerprint generator. Similarly the content search server sends information about the detected audio transforms between reference and query. Thus for further fingerprinting, the fingerprint generator can use light weight processes with much lower compute cost, since the detected transforms can be applied to reduce the similarity error of the generated signatures. At step 609, the time schedule of the program, ad slots and required action are retrieved when the content is identified. At step 605, audio and video analysis reports are received from the fingerprinting step 601. At step 605, the search, audio, video analysis, detected logo information, and similarity reports are received and video segmentation is performed. At step 605, the content is tracked until the expected time slot of action. At the expected event time, the incoming content is verified if it is exactly the same as the expected one. This check is performed in step 611. At step 607, video and audio analysis is performed to locate a likely location on the video frame and identifies the location where information can be inserted. This functionality can be used to enhance the program watched, and to overlay messages or advertisements. The video analysis at step 607 detects space on the video frame that is relatively free or smooth. Video frame alignment at step 604 provides information that describes the relationship between the client video frame and the reference video frame. Step 613 executes the overlay, insertion or advertisement replacement onto the streaming broadcast content.

Figure 7A:
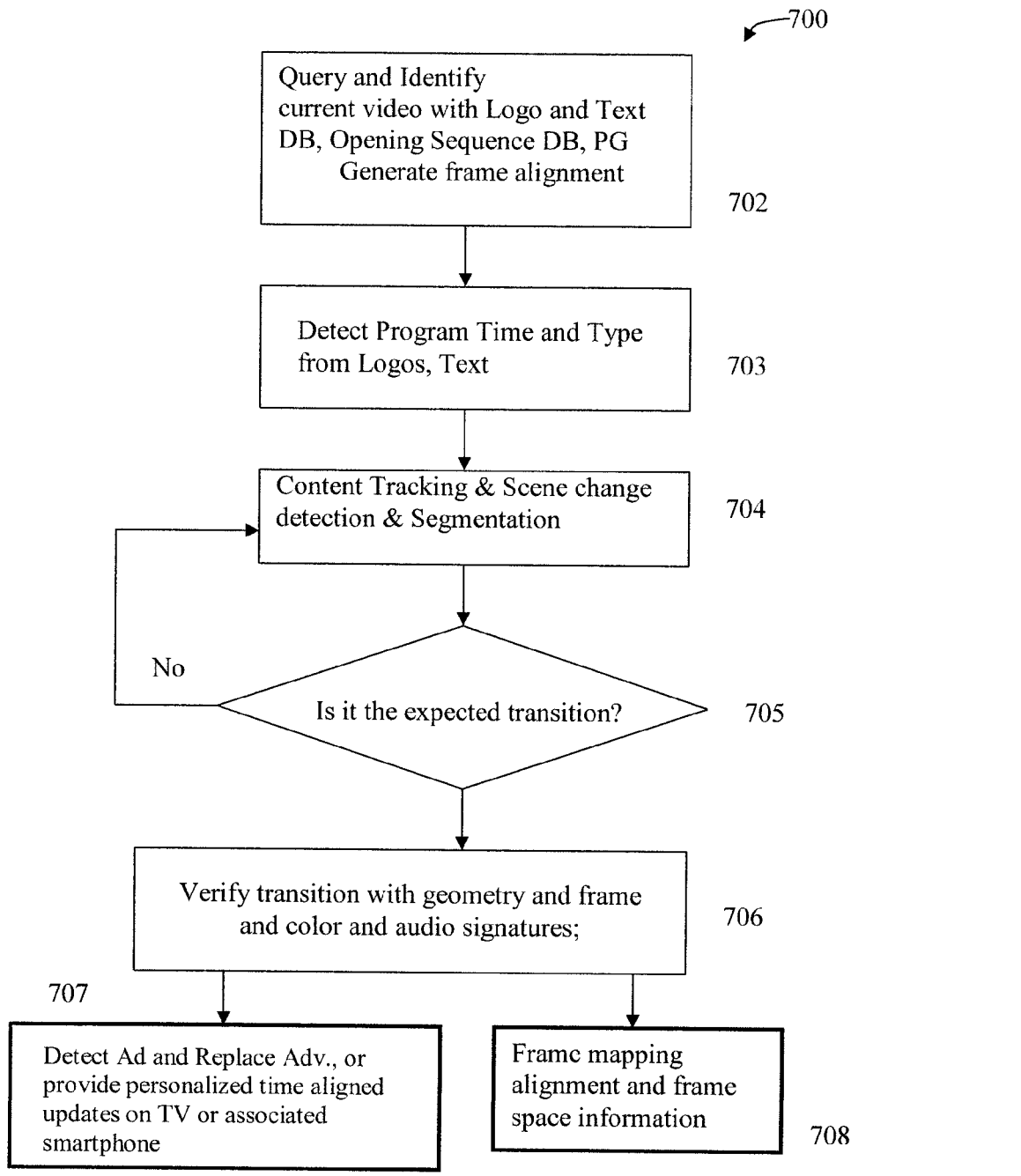
FIG. 7A illustrates a flowchart to perform fast and accurate content segmentation on broadcast non-recorded content playing on a consumer devices and offer time aligned services.

FIG. 7A illustrates a flowchart 700 to perform fast and accurate content segmentation on broadcast non-recorded content, and overlay content information on one or more selected display screens. At step 702, a content analysis is performed and then a query and search operation executes on a database on the client device and then if no match is found on the local client device, a query is sent to a central server (cloud) to identify current video. Since the goal is to detect non-recorded television broadcast segments, the process cannot rely only on fingerprints since none exist for a non-recorded broadcast segment. The logo of the channel, the program logos, and opening sequences of the program are used to assist in identifying the content. At step 703, the client performs continued tracking by verifying the program details from text and logos in the content. At step 704, scene change detection is utilized on the client content to select frames to perform fingerprinting and correlate to generate reports to support segmentation. At step 704, the client content that includes time sections is also tracked, where the content being played does not even have the logo information. The process 700 is able to do such tracking by using similarity information from audio and video which can identify the likelihood of the same video. At step 705, on a scene change or audio transition, a determination is made whether this transition is a possible content change. If the transition is not a possible content change, the process 700 returns to step 704. If the transition is a possible content change, the process 700 proceeds to step 706. At step 705, an "expected transition at a given time" is checked for, since it is intended to replace a specific ad which is expected at a given time for typical TV program. For live broadcast such as NBA basketball, "the expected transition" may occur at any time and is checked for accordingly. At step 706, with multiple fingerprint methods verifies whether the expected content matches the content in the client buffer which may not necessarily be played out. If the advertisement or content to be replaced needs to be associated with a time-aligned service, that action is performed quickly in step 707. The processing step 706 communicates the detected frame alignment of the query video, and information about space usage of the video frame via step 708. The display information, at step 708, enables the optimal overlay of user service or advertisement information.

Some examples of the time aligned services that are provided are listed below.

a. Audio track for specific use such as languages or overlay commentary.
b. Sign language track overlay.
c. Personalized services overlay.
d. Overlay or replace content based on certain event detection based on personalized services programming rules.
e. Video overlay of local advertisements.
f. Video overlay of local activities.
g. Advertisement replacement.
h. Partial advertisement replacement.
i. Providing time-aligned services on another screen or personal phone.

Figure 7B:
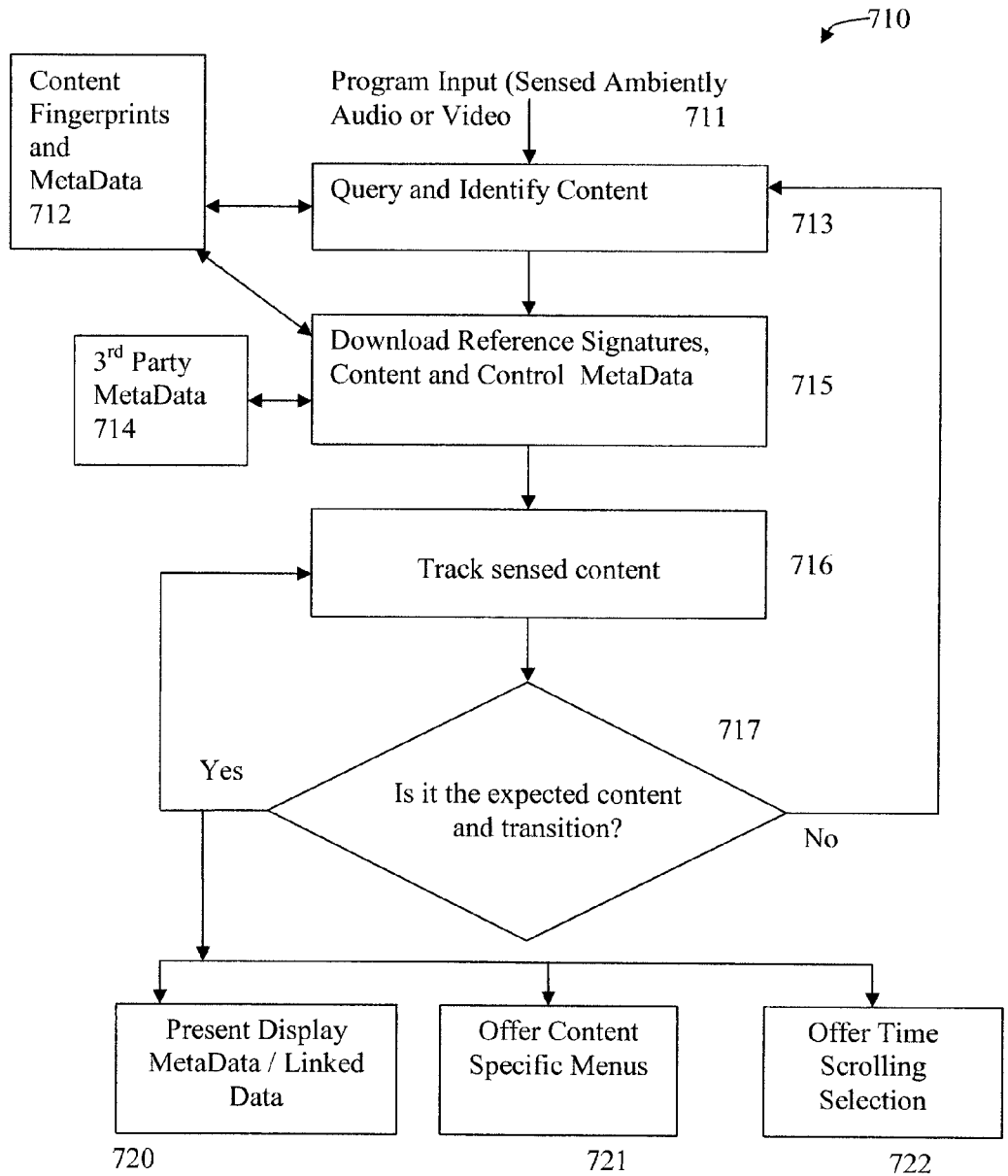
FIG. 7B illustrates a method for time aligned applications with multi-media content publishing and user control.

FIG. 7B illustrates a flowchart 710 to offer time-aligned services of enhanced viewing experience on one or more selected display screens utilizing content metadata or additional content sources.

Another embodiment of the invention addresses content identification and tracking, and segmentation that enables new time-aligned services to the user. Another embodiment of the invention addresses a method of content publishing with associated content data, associated content links, and content control menus, supported by intuitive user control menus. Such content publishing enables an entire ecosystem of content publishing. An ecosystem of time aligned (synchronous) content publishing enables the provider to distribute synchronous streams of information that can be consumed on different user devices such as second screens. The synchronous streams can be used to replace original content with targeted ads, subtitles, audience rating or the like when desired. The ecosystem of content publishing including generating synchronous content streams, associated data, content control and user control and display menus. Thus new methods of content publishing, content consumption and user interaction are enabled. For example, the time-aligned services can be consumed on a separate device or screen without disturbing a main display screen. In current TV and video playback cases a user may not have control or may not want to exert control especially when other viewers are watching. The methods for time-aligned services enable each user to have a private selected experience of viewing a program along with additional specific information such player statistics, or dance steps, or local costume designers of actor apparel.

The reference content is processed initially to generate fingerprints and associated data and content streams at step 712. To enable content publishing for second screen applications, additional information must be generated and linked at the servers. Fingerprints and watermarks in content are used to identify content at client. For each broadcast content, additional content choices can be created such as an alternative language, such as Spanish audio stream and Spanish text overlay for screen, sports statistics per event in the sports game, bio, or action information during a prime time TV program. Links to such content or metadata associated with the content for the additional information may be stored at servers along with the reference fingerprints, if required. To enable a rich user experience, menus for user control of information, display, and content selection are provided to the users.

At step 714, $3^{rd}$ party content information or streams are provided. At step 711, the content is sampled or sensed. At step 713, a content query is performed, for example on a search server, to identify current video content playing on the client. At step 715, the tracking function requests further download of fingerprints and content, control metadata. At step 716, the client tracks the input content fingerprints with the reference. Also at step 716, if tracked content continues matching updated content, display and control options are provided to user. At step 717, a determination is made if the content at the transition is expected content. If the expected content is found at the transition, then further actions and information transfer for next actions is performed by steps 720, 721, 722; and content continues to be tracked at step 716. If content does not track, segmentation is used to decide the content type and decide whether to keep looking for local match, or send a new query to a search sever. If the sensed or input content stops tracking the reference, the process 710 continues to the content identification step, 713. At step 720, the content information from the $3^{rd}$ party metadata and content metadata links is displayed. At step 721, the user is offered control for content viewed on one or more display screens, including choices for display screen and format selection, content type selection. Time scrolling selection is offered at step 722.

Figure 8:
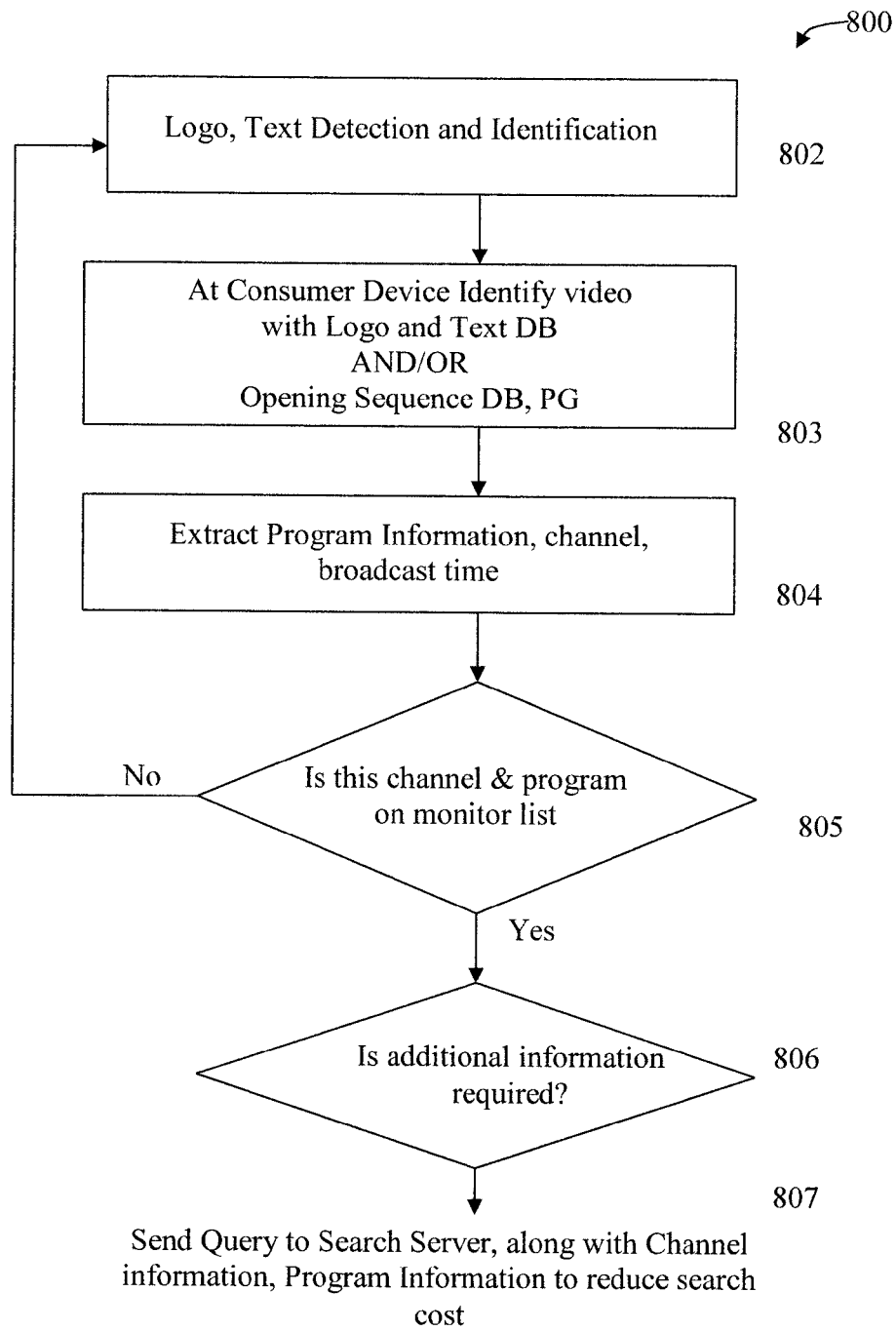
FIG. 8 illustrates with a flowchart to perform audience measurement or video monitoring on consumer devices.

FIG. 8 illustrates a method 800 to perform efficient broadcast monitoring on clients using video segmentation and a central search system for content matching. Segmentation is utilized to improve accuracy and bring scale efficiency to advantageous time-aligned applications.

An embodiment of the invention is a method that uses the current identification state to selectively invoke specific feature detectors or descriptors, thus optimizing the memory and compute resources required on the remote client. The invoked feature detectors or descriptors are then used in performing a search to obtain content match or track the content. This method is particularly useful when supporting many clients making large scale deployment economical, and reducing the compute loads on the remote client devices. With reduced compute loads, the client devices are capable to do user friendly tasks such as fetching and displaying content and responding to user interactions.

Another embodiment of the invention is a technique for time-aligned services identification of content and for tracking incoming or sensed content which provides a stored content sequence that may be used for detection. In the tracking mode, a correlation is performed at scene changes and audio turns, to check and verify that the incoming content remains similar to the expected program content. This method can improve the accuracy of content tracking while reducing the computation cost. The feature to track content more intelligently using scene change and audio turns also enables delivery of time-aligned applications for live broadcast content where pre-recorded fingerprints are not available.

Techniques for efficient content monitoring and audience measurement include tracking of a logo, a program logo, and other types of logos and scene change markers which are used to reduce client computation and fingerprint processing bandwidth. Computation is reduced by electing to do fingerprinting in conditions where it is likely that the content has changed due to user or broadcast network such as scene change or audio turns. Similarly bandwidth is reduced by sending fingerprints at significant events or at a lower sampling rate once content has been identified and is being tracked.

An embodiment for time-aligned services identifies content and tracks incoming or sensed content to stored content sequences. In the tracking mode, a correlation is performed at scene changes and audio turns to check and verify that the incoming content remains similar to the expected program content. This method can improve the accuracy of content tracking while reducing the computation cost. The method to track content more intelligently using scene change and audio turns also enables delivery of time-aligned applications for live broadcast content where pre-recorded fingerprints are not available.

At step 802, a logo detection and identification is performed on the incoming broadcast video input. Next, at step 803, the broadcast video is identified and classified on a client device using any of the following methods:

(1) generating audio and video signatures, and searching on stored opening sequences of programs.
(2) extracting text and program logos or program specific logos, such as a team's name, from the videos.

At step 804, after identifying the broadcast incoming video content, critical relevant information of an event is extracted from played audio and video utilizing available information such as an electronic program guide (EPG) or simply a PG. At step 805, a check is made as to whether the classified and identified content is among the channels and programs that need to be monitored. At step 806, a determination is made whether additional information is required at the client. If so, at step 807, the query is submitted, including detected signatures, text, logos, detected channel and programs, to the search servers which accurately identify the content.

The efficiency of broadcast monitoring is improved by deriving information from video segmentation. Queries from monitored clients can be limited to a particular class of database, based on an identified channel or program. Video segmentation classifies commercials or promos being played, and the queries to the search server can be avoided if commercials for some or all programs do not need to be monitored. Video segmentation methods for pre-recorded and live broadcast content are described in FIGS. 2A, 2C, 3, 4A, 4B and applications in FIGS. 5A, 5B, 5C, 6, 7A, and 7B. If content being played at client site is classified or identified as an advertisement, the client agent can avoid a query to server when only content is being monitored.

Learning rules to identify new content are used to improve efficiency of the search system. If a particular user watches or plays popular video games, these can be identified by the remote client based on a set of rules about the content playing. The set of rules about the content played by user can include extracted logos, text, video frame color and interest region based fingerprints and audio fingerprints. By identifying and classifying different content at the user, queries to the search servers can be limited to content of interest to the video monitoring application. In general, the same applies to any content based application that is active, as described further in the application.

The rules for segmentation are program specific, each program follows are particular format. Further each user typically watches a few programs. It is possible to learn the rules for segmentation for each user based on this information, and have high segmentation accuracy. In addition the basic video segmentation utilizes content search databases to segment known content, and uses inter frame and content similarity analysis to further assist segmentation, besides using other information, such as program and channel logos, content information and EPG which indicates the broadcast schedule.

Figure 9A:
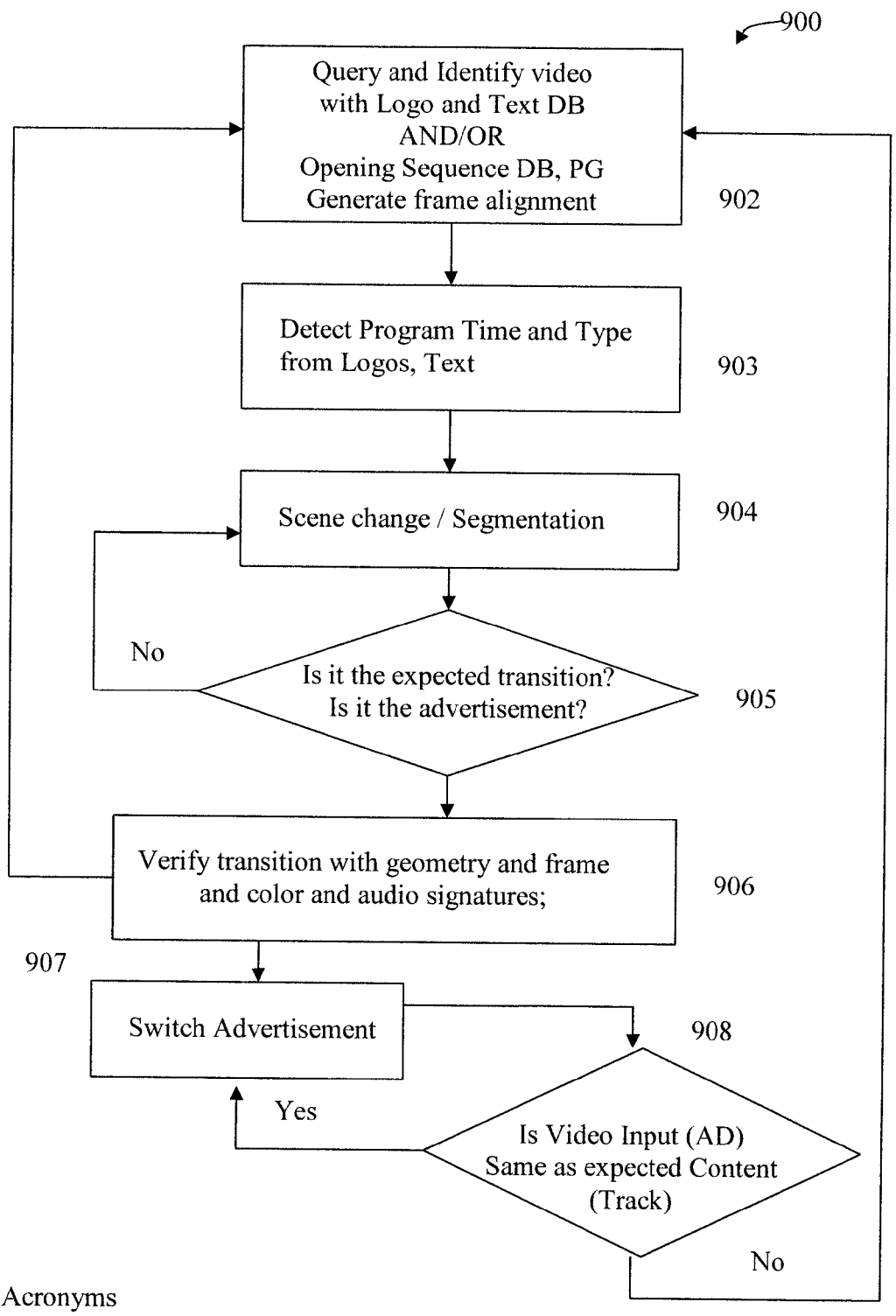
FIG. 9A illustrates a method to perform time aligned services such as advertisement replacement on consumer devices.

FIG. 9A describes a method to provide a time-aligned service such as advertisement replacement during a video broadcast. Initially, the content playing is identified at step 902. The content playing can be identified using a variety of methods including:

(1) generating audio and video signatures and searching on stored opening sequences of programs for time aligned search on a local client device to minimize search latency or a central server.
(2) extracting text, program logos and program specific logos, such as a team's name by OCR (optical character recognition) from an image, or database description of detected logo.
(3) querying a search server reference database using audio, video signatures of content and other extracted information such as channel and program identification. The search server also detects the video frame mapping of consumer device video reference video and determines frame alignment information between a query and reference content found in the reference database.

At step 903, the actual time alignment of the content playing on the consumer device relative to broadcast content is identified and tracked. During search and correlation, the time alignment of reference and query content is determined. During tracking, the accuracy of the time aligned is further improved. Further, the incoming video is processed to detect scene changes and audio turns, and this is followed by video and audio processing such as at the detected scene change and audio turn. The video processing includes signature generation, logo detection and identification, using the generated data to track the identified content, to identify changes in the content, and to start content identification afresh. At step 904, the tasks of scene change, audio turn detection, and segmentation are performed on the incoming video. Methods of scene change may be used to detect a large change in the image and similarly detect an audio turn which is, for example, a large change in the audio sound. If the identified content is selected to have an advertisement replacement, such as possible localized and personalized advertising, then at step 905, the expected start time for the advertisement to be replaced is updated using a projected value of the match time. Thus step 905 includes projecting the time of the expected advertisement in terms of the current system clock time, while monitoring the segmentation changes within the incoming video content. Step 905 eventually identifies that a scene change event is within the target range of the start of the selected advertisement to be replaced. Then, step 905 invokes the verification step.

At step 906, the incoming content at the expected time range is verified to be the expected advertisement. Step 906 also recovers the frame alignment information between the query and reference video, and can regenerate the video frame or interpret the video analysis process appropriately. Step 906 also generates signatures on a small time sample of the incoming video beginning at the identified scene change event using audio and video fingerprinting. Next the generated signatures are compared against the beginning period of the original advertisement, specifically, such as the first video frame and associated audio of the original advertisement. If the incoming video agrees with the expected advertisement, the local video buffer display is switched to the new alternate advertisement. It is possible to perform a highly accurate check that the expected video frame is matches the incoming video first frame. Video fingerprinting which detects interest regions at interesting locations on the frame, and generates descriptors of region around the interest regions, and the associated coordinates and scale of the detected regions allow a very accurate check. Additionally the video time locations and selected transitions allow only very few possibilities for matching. Alternate methods of video fingerprinting using intensity and color information can also be used for highly accurate matching between reference and first video frame. If the comparison does not match, the process 900 returns to step 902. At step 907, the advertisement is switched and the video frame mapping is decided based on the detected frame mapping from step 902, and tracked through steps 903, 904 and 906. At step 902 when content is identified an initial mapping of the reference to query screen is performed. Further this mapping is refined and tracked through client operations 903, 904 and 906. In the meantime, at step 908, the incoming content is monitored and tracked to verify it matches the expected content. The advertisement replacement process continues until the incoming advertisement ends or defined substitution time ends and while incoming content, such as advertisements is the expected content. A replacement advertisement may be a partial replacement or an overlay. An appropriate delay buffer may be used to accommodate the delays for identifying and verifying advertisement for switching, so that user experience is not at all degraded.

A simpler method for advertisement replacement may be employed by the cable operators with the co-operation of the content owners. In this situation, the timing information of the original advertisement and the one to be replaced are available to the cable operator and at the end user set top box or equivalent. The problem remains how to deliver the alternative advertisement to the end user. This alternative advertisement can be delivered by internet or over certain channels on the cable. A similar approach can be assumed for over the air broadcast. However these solutions are not applicable when the assumptions are not valid such as when the content owners and cable operators do not agree on deploying this mode of advertisement replacement.

Thus we have described a method above that enables content broadcaster to customize their advertisement slots per user. The content owner creates the program schedule describing the time and location of advertisements and the rules for replacing specific advertisements. The rules for replacing specific advertisements are executed by the clients. The methods to do the steps for executing "content replacement" are described in FIGS. 7B, and 5C. FIG. 9A in contrast illustrates a content publishing method with user control; wherein the user can choose the type of synchronous content during the entire TV viewing experience.

Figure 9B:
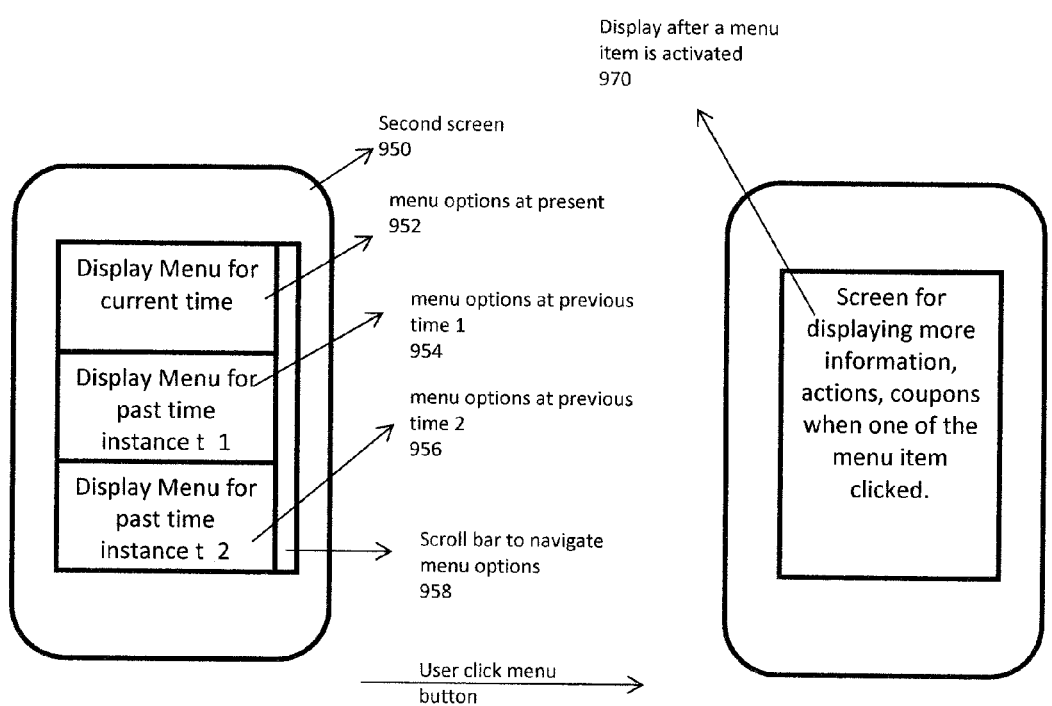
FIG. 9B illustrates an exemplary example time aligned application that can be created using various services described in this application.

FIG. 9B illustrates an example of publishing content as a time-aligned application. One aspect of this application is that the time aligned applications would synchronize to the show the user is currently watching on a big-screen TV using content identification technology. After the identification of the content, these applications would display some additional content which may include text, images, and video, links to supplemental on-line information, buttons for shopping, voting, or other actions, on the second screen. The contents to be displayed are synced with the main content and the content publisher would be able to specify the relationship between the content and the additional information displayed on the second screen.

FIG. 9B describes an exemplary example time aligned application that can be created using various services described in this application. In this simple application, the second screen device is shown displaying various menu options 952, 954, 956. The menu option 952 is associated with the content being currently displayed, while menu option 954 and 956 are associated with the content that is displayed in the past.

When a user clicks on any of the menu options 952, 954, 956, the application displays more information 970 as shown in the figure. As the content on the main display screen progresses, menu option 952 is updated with a new menu option obtained through a request to the content identification service network. The menu options for previous events are pushed down forming a stack of the menu options. Such stacked menu options 952, 954, 956 can be scrolled using scrollbar 958. Menu options can have further menu options within themselves forming a chain of menu options.

To implement these time aligned publishing the publisher needs to provide following information.

Time offsets to display menu options from the start of the show;

Associated content with the menu option that would be displayed when a menu option I activated by the user. The content can include displayable and interact-able content including but not limited to text, graphic, multimedia, actions.

FIG. 9C illustrates menu formats. For time aligned publishing, the menu choices can be provided in various formats. An example partial xml format is illustrated in FIG. 9C. This example shows two menu options. The first menu option is displayed 60 seconds after the program starts with a menu title "Welcome to the program". The detailed content is specified under the tag "display_content" which for this menu is shown only for 240 seconds. After 240 second, this menu option is removed from the stack of the menu options. The second menu option is displayed after 300 seconds with a menu title "Know more about the program" and is displayed for 900 seconds.

Figure 10:
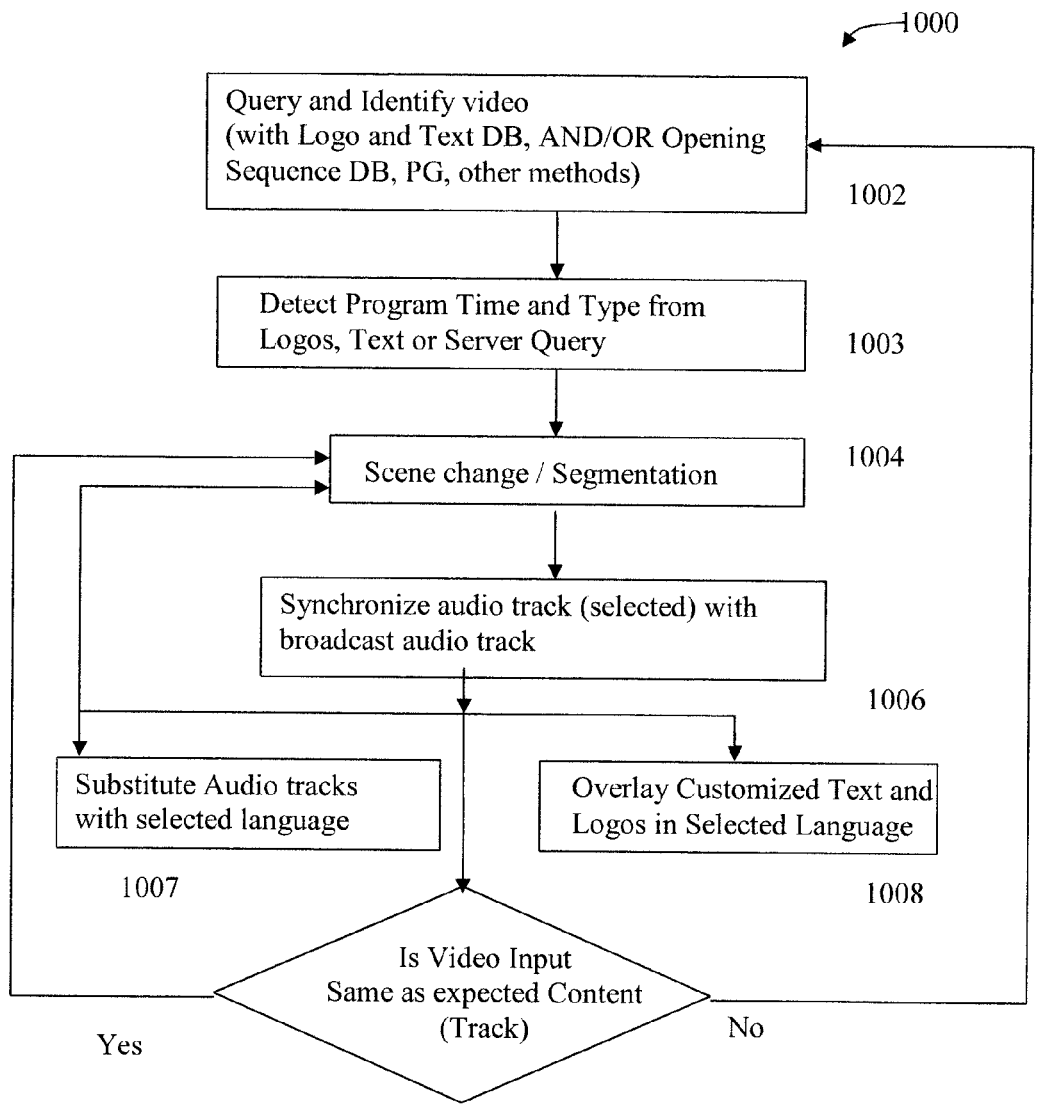
FIG. 10 illustrates a method to enable multiple language choices for over the air or over cable broadcast on consumer devices; by overlaying text appropriately on the video screen, and substituting audio with the selected language.

FIG. 10 describes a method 1000 to provide a time-aligned service such as selecting a language of choice for a broadcast video program. Initially, the content playing is identified at step 1002. The content playing can be identified using a variety of methods including:

(1) generating audio and video signatures and searching on stored opening sequences of programs.
(2) extracting text, program logos and program specific logos, such as a team's name
(3) querying a search server using audio, video signatures of content and other extracted information such as channel and program identification.
(4) using a program guide to identify the content and performing content identification or an alignment operation between query and reference.

The search server also detects the video frame mapping of consumer device content query.

At step 1003, the actual time alignment of the content playing on the consumer device relative to broadcast content is identified. Further, the incoming video is processed to detect scene changes and audio turns, and this is followed by video and audio processing such as at the scene change or at an audio turn. The video processing includes signature generation, logo detection and identification, and these are used to track the identified content or to identify a change in the content and start content identification afresh. At step 1004, the tasks of scene change detection, audio turn detection, and segmenting the incoming video for processing are performed. At step 1006, the frame alignment information is recovered between the query and reference video. Then signatures of the incoming broadcast content and reference video are generated. The signatures are used to synchronize the incoming video time to the reference. The detected relationship time of an incoming video is used to align with the selected language customizations, the audio track and the text and/or video overlays over the original video. The continued updating of the detected time relationship between reference and current video can be performed by multiple methods including:

(1) Audio-video synchronization standardized signatures.
(2) Frame based video signatures and audio signatures.
(3) Interest region based video signatures and audio signatures.
(4) With audio turns and scene change timing.
(5) With audio turn and scene change along with audio and video frame information at the relevant time.

At step 1007, the selected audio tracks are switched and the text and video overlays are performed using the video frame mapping information from step 1002. The incoming video content is thus aligned in time and in video space through steps 1003, 1004 and 1006. In the meantime, at step 1008 the incoming content is monitored and tracked it in time with the expected content. At the same time, alignment between reference and current playout is updated at step 1006. A language customization application for audio substitution and video overlay continues while the incoming content is as expected. If the content stops tracking with expected content then control moves to step 1002.

A simpler method for selecting language of choice may be employed by the content owners with the co-operation of the cable operators. In this situation, the timing information of the broadcast content and the language customization data are available to the cable operator and at the end user set top box or equivalent. The problem remains how to deliver the alternative language customization data to the end user. This additional data can be delivered by internet or over certain channels on the cable. A similar approach can be assumed for over the air broadcast. However these solutions are not applicable when the assumptions are not valid such as when the content owners and the cable operators do not agree on this mode of deployment of multi-language choice service.

Figure 11:
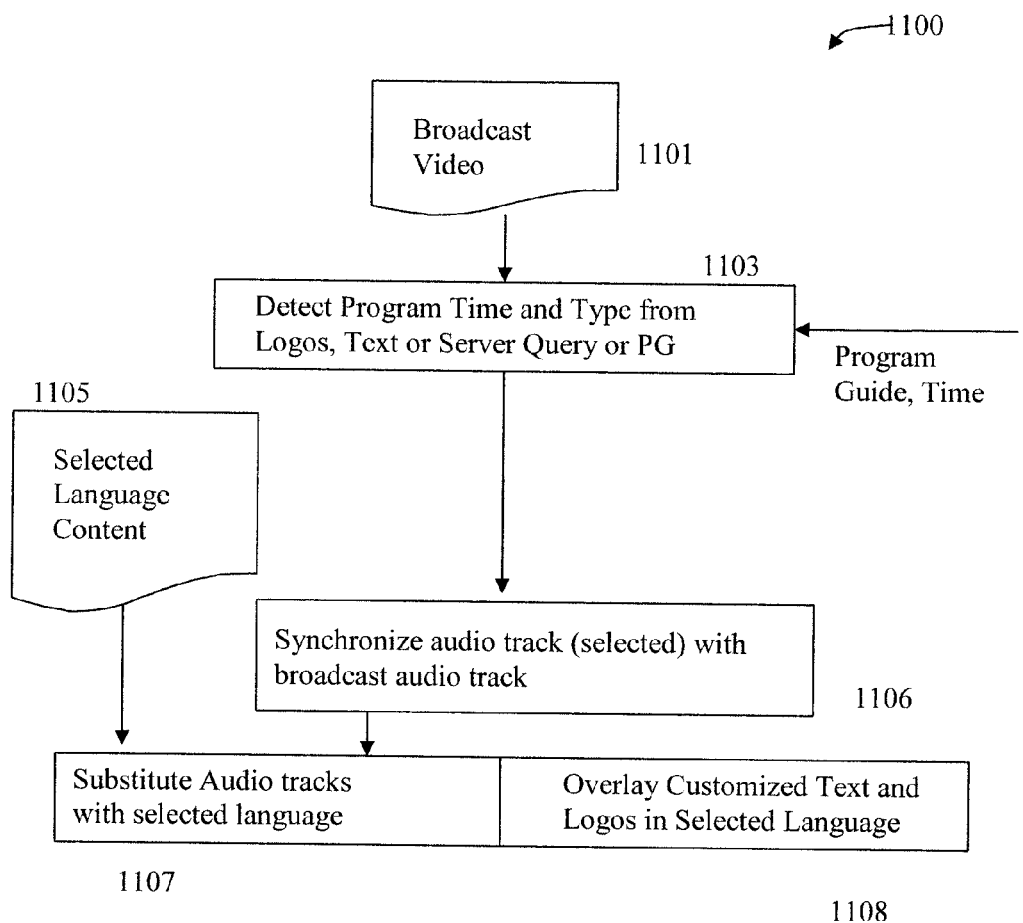
FIG. 11 illustrates a simple embodiment to enable multiple language choice for over the air or over cable broadcast on consumer devices. This method can also be applied to live linear broadcast where content fingerprints are not immediately available.

FIG. 11 describes another embodiment of a method 1100 to provide a time-aligned service, for selecting language of choice for a live non-recorded broadcast video program. The incoming video received at step 1101 is processed at step 1103 to identify the content using any of the following methods:

(1) generating audio and video signatures and searching locally or on server
(2) extracting text, program logos and program specific logos and a program guide to identify the content for detected program logo and verifying with extracted text.

At step 1103 time alignment information is maintained between query and reference. At step 1106, the detected incoming video's reference time is used to align with the selected language customizations. The audio track and the text and/or video overlays are added or overlaid at step 1107 and 1108, over the original video. The additional data to implement the language customizations, determined from step 1105, can be provided over the air or cable or internet. At step 1106, the video frame alignment is also optionally detected between the incoming video and the reference. The video frame alignment is detected using the known locations of logos, detected text between the client video and the reference video. Time alignment is performed by comparing scene change timings for audio and video content including text and logo changes. To provide the language customization service, the participation of the original content provider is necessary to generate the customization information simultaneously as the current content. Since both the original content and customization are generated together, crucial information to align both the original and client side playout can be generated via signatures, or via scene change, content change information with associated time. Since the broadcast content is live and not pre-recorded, querying to server cannot be used without a delay factor involved which can be upwards of 5 or more seconds. A solution which may be used transfers the information that enables time alignment of the language customization directly to the client. The client can thus detect the time alignment between the reference and the language customization data and stream. Earlier, at step 1105, the client extracts content alignment synchronization information such as text, logos, scene change, fingerprints from the incoming broadcast video input which can be over air or cable or Internet.

At step 1107, the selected audio tracks are switched and text and video overlays are performed using the video frame mapping information from step 1106. And at step 1108, the text and video overlay for the selected language are overlaid on the video frames.

Figure 12:
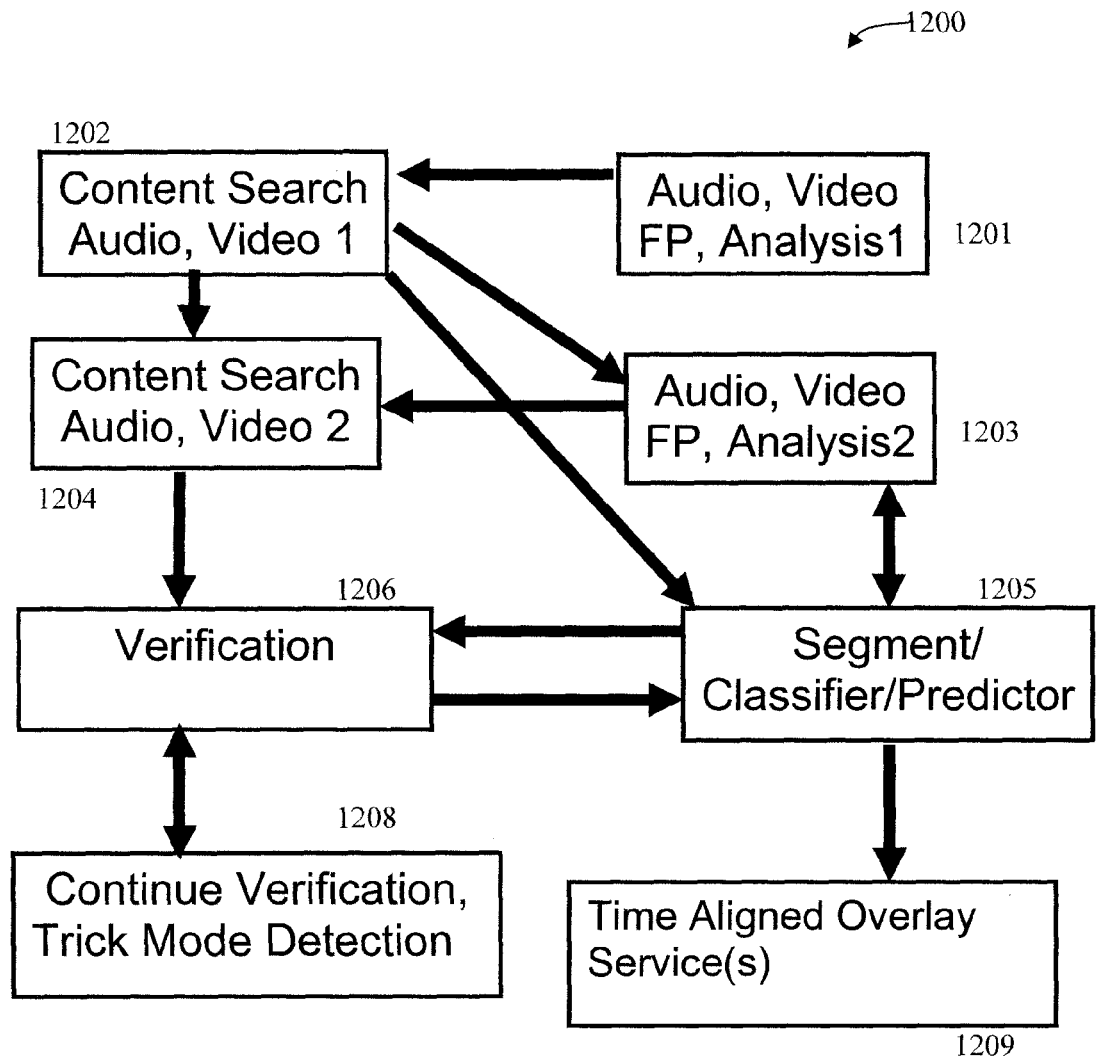
FIG. 12 illustrates a system method to monitor broadcast TV content on a consumer device while using adaptive and hybrid fingerprinting methods.

FIG. 12 illustrates a method 1200 to segment broadcast TV content using hybrid and adaptive fingerprint methods. In an embodiment for efficient content monitoring and audience measurement, tracking of logo, program logo, and other logos and scene change markers are used to reduce client computation and fingerprint transfer bandwidth. The computation and fingerprint bandwidth is reduced by electing to do fingerprinting in conditions where it is likely that the content has changed due to user or broadcast network action.

At step 1201, fingerprinting and content analysis is performed on broadcast content. At step 1201, the fingerprints of each program are transmitted as a query to the content search Server1, for a search operation at step 1202. The content search server1 returns the search report containing the detected match data to step 1204, to fingerprint step 1203, and to the segment/classifier step 1205. At step 1204, the content search server1 transfers the information about the frame alignment and the time alignment between the reference and query to the fingerprint generator2, step 1203. Subsequent content searches are sent to content search server2, step 1204. Thus for further fingerprinting, the fingerprint generator2 (step 1203) can use light weight processes with much lower compute cost, since the detected transforms, such as frame alignment and audio transform, can be applied to reduce the similarity error of the generated signatures. The segment/classifier step 1205 manages the incoming content, and controls (activates and disables) the time aligned service. Step 1205 includes the functionality of segmenting, classifying and predicting the time alignment of incoming video. The step 1205 also communicates the video frame alignment information, so that video overlays can be performed optimally. Step 1209, executes the video overlay, insertion or advertisement replacement onto the streaming broadcast content. Before any overlay can start the time alignment between the reference and incoming content, the incoming content is verified in step 1206. The verification step 1206 can use a variety of fingerprinting methods to generate signatures and correlate to verify the time alignment with the reference signatures. Step 1208 continues to perform more light weight verification, and content tracking; and trick mode detection on incoming content while the time aligned services are overlaid on the incoming broadcast video, by step 1209.

An embodiment is described that detects trick mode playout, and trick mode detection is necessary during execution of time-aligned services. Trick mode is defined as a digital video recorder (DVR) actions of fast forwarding or skipping sections or rewinding video content. Scene changes and audio turns that are detected are compared with the expected times, as these may be unaligned due to possible trick mode operations. Then, a verify operation of trick mode or other unexpected changes is performed and a graceful transition to normal video input is performed. The verify process for trick mode can be as simple as checking that audio and video content is not aligned to expected content's scene changes and audio turns. A more complex process employs comparison of fingerprints between the expected content and the current played out content. The verify process can be used for live broadcast where pre-recorded content is not available. However fingerprints of already played out live broadcast content can be stored locally or on a central server. These recorded fingerprints of non-pre recorded broadcast can be used to detect possible trick modes, such as rewind, and align with the correct time of video content being played out on the TV or other screens.

The above descriptions illustrate various methods to enable language customization including live broadcast TV. Below is another example that shows how a typical use case is supported with live broadcast TV using the invention described. A user is watching FIFA soccer matches on a TV using a cable subscription channel. The matches are in English language while the user prefers Portuguese language. The user performs rewind to watch some events and then performs the forward function till most current action is reached. The content playing on the TV is identified using content identification or logo identification, and text extraction. Continuous synchronization is enabled by performing correlation between the information coming via language customization and the information extracted from the incoming broadcast video. When a user rewinds, the scene change misalignment is detected quickly in about a second and the time alignment between the rewound content and reference is identified using signatures or with logo and text information. The same methods are applied for fast forward till current time is reached.

In an alternate embodiment, a trick mode is detected by performing logo detect processing and matching for trick mode overlay buttons on the video.

In an alternate embodiment the client stores a small search database of fingerprints that match opening sequences of programs. Additionally, the client stores a small database of logos, and program logos, and in certain cases specific logos of teams for sports programming. To detect dynamic logos, a set of rules about the dynamic logos are stored. These local databases are then utilized to identify content playing on a client, or utilized to make a likely guess about the match. To verify the "likely match" specific additional information is downloaded or queried with the central servers to support identification and segmentation. The additional information can be color descriptors, signatures of template videos, speaker voice models.

In another embodiment, the client learns and caches critical information about the popular channels and programs watched and the associated channel logos, program logos, program specific text and logos, and video frame layouts. This learning is used to optimize the cost and accuracy of content identification and segmentation. The above learning of video frame layouts for popular programs includes specific details such as text locations, color, logos or text locations within video frames such as team scores.

Additionally this learning ability to learn video frame layouts and opening sequences for popular content is utilized to significantly reduce the number of queries sent to the search server to identify content being played out on remote clients.

A learning engine is used to learn rules to best segment and identify content at each client by adding relevant and user specific sequences, video layouts, opening sequences and closing credits to the content databases. The learning engine also assists in creating the rules for identification of new programs and channels at the client device. The ability to learn new rules to identify content can significantly improve the efficiency of a content monitoring system, since identification at a client can prevent queries being sent that are avoidable and can target a search to appropriate search databases separate from the client device.

In another embodiment the rules learned at the client are communicated to the server and all the rules learned for content can be stored on the central servers, which enables classification and categorization and identification of the content.

It is understood that other embodiments of the present invention will become readily apparent to those skilled in the art from the following detailed description, wherein various embodiments of the invention are shown and described by way of the illustrations. As will be realized, the invention is capable of other and different embodiments and its several details are capable of modification in various other respects, all without departing from the present inven-

What is claimed is:

1. A method for time aligned identification of video content playing on an electronic client device, the method comprising:
    receiving by the electronic client device, a video stream for presentation by the electronic client device, the video stream containing a first video content followed by a second video content;
    generating by the electronic client device, a first set of signatures for the first video content;
    identifying by the electronic client device, the first video content based on an analysis of the first set of signatures compared to reference signatures stored in a database;
    detecting by the electronic client device, a scale ratio mapping between video frames of the identified first video content playing on the electronic client device and reference frames stored in the database by calculating a scale ratio along an x axis (Sx) and a difference scale ratio along a y axis (Sy) for a query signature in the first set of signatures and a reliable matching reference signature in the database, wherein the calculated scale ratios Sx and Sy indicate that the video frames of the identified first video content and the reference frames are not in alignment;
    responsive to calculating the scale ratios, using the detected scale ratio mapping to generate subsequent signatures for subsequent incoming video frames; and
    monitoring the subsequent incoming video frames for the second video content by the electronic client device to determine that the video stream has made a scene change from the first video content to the second video content.

2. The method of claim 1 further comprising:
    replacing the second video content beginning at a time the scene change is verified with a third video that is different than the second video content.

3. The method of claim 2, wherein the second video content is an expected advertisement within an expected content or program stream.

4. The method of claim 1 further comprising:
    displaying synchronous information on a selected device.

5. The method of claim 1 further comprising:
    providing a user selection of display devices for synchronous display of data in place of the identified second video content;
    providing a user choice of content for synchronous stream content in place of the identified second video content; and
    providing a user choice of scrolling in time to select content choices including synchronous content and the identified second video content on the client device.

6. The method of claim 1, wherein identifying a time alignment comprises:
    sequence matching and correlation between reference and query fingerprints.

7. The method of claim 1, wherein identifying a change in multimedia content comprises:
    detecting a scene change.

8. The method of claim 1, wherein verifying a sample of multimedia content comprises:
    matching the sample of multimedia content with a first frame or an opening sequence of an expected multimedia content.

9. The method of claim 1, wherein audio content is corrected for changes in pitch and changes in frequency response.

10. The method of claim 1, wherein Sx is equal to $(QA(x)-QB(x))/(RA(x)-RB(x))$ and wherein $QA(x)-QB(x)$ is a difference in query x coordinates of signature pairs A and B and $RA(x)-RB(x)$ is a difference in reference x coordinates of the signature pairs A and B.

11. A method of providing time-aligned services on broadcast non-recorded content, the method comprising:
    analyzing by an electronic client device, incoming video of a broadcast live event based on comparisons with opening sequences of programs stored on the electronic client device to determine program details associated with the broadcast live event;
    generating by the electronic client device, fingerprints of selected frames of the incoming video;
    searching a reference database using the generated fingerprints to identify a likely match for content of the incoming video with content of an original video stored in the reference database; and
    correcting by the electronic client device, frame alignment in the incoming video based on a scale ratio mapping by utilizing a scale ratio for an x axis (Sx) and a different scale ratio for a y axis (Sy) between the selected frames of the incoming video and corresponding frames of a matched original video selected from the reference database and for generating subsequent fingerprints based on the scale ratio mapping to enable a time aligned service to overlay on aligned video frames for display on a display of the electronic client device information personalized for the electronic client device.

12. The method of claim 11 further comprises:
    searching on the electronic client device a subset reference database that is a subset of a remote database using the generated subsequent fingerprints in queries to minimize computational effort and improve accuracy in identification of the incoming video; and
    searching on the remote database in response to a match not being found in the subset reference database.

13. The method of claim 11 further comprises:
    using search reports and content analytics to determine a classification of content at time nodes and a similarity between the time nodes generated for the incoming video;
    generating edge weights between the time nodes, wherein the edge weights represent the similarity between two edge connected time nodes; and
    performing graph based segmentation to segment video based on the classification and similarity between the time nodes.

14. The method of claim 11 further comprises:
    determining a geometric correlation of video signatures and associated data comprising geometric coordinates and scale information between the incoming video and the matched original video to represent transformation of the matched original video that approximate the incoming video.

15. The method of claim 11, wherein video segments of the incoming video represent chapters of a program, advertisements, and promotions.

16. The method of claim 11 further comprises:
    generating the fingerprints of incoming video including a determined region's location and scale information;
    determining a reliable match of content from incoming video with the reference database; and generating frame alignment information that includes pixel offsets along the x axis and along the y axis, the scale ratio for the x axis (Sx), and the scale ratio for the y axis (Sy) to represent transformation of the matched original video that approximate the incoming video.

17. The method of claim 16, wherein generating frame alignment information comprises:
generating pixel locations for each fingerprint generated for the incoming video;
calculating the scale ratios Sx and Sy based on pixel differences between a query signature pair and a reference signature pair along each axis;
summing up the scale ratios calculated on each axis and averaging while excluding outliers; and
calculating a pixel offset on each axis for matching pairs of signatures based on the scale ratio on that axis and the determined region's location for the query signature pair and the reference signature pair.

18. A method to identify and track video content by an electronic user device, the method comprising:
detecting by the electronic user device, a scale ratio mapping between incoming video frames received by the electronic user device and reference video frames stored in a reference database by calculating a scale ratio along an x axis (Sx) and a different scale ratio along a y axis (Sy) for a query signature in an incoming video frame and a reliable matching reference signature in a corresponding reference video frame stored in the reference database, wherein the calculated scale ratio Sx and Sy indicate that the incoming video frame and the corresponding reference video frame are not in alignment;
responsive to calculating the scale ratio, using the detected scale ratio mapping to generate subsequent signatures for subsequent incoming video frames; and
processing by the electronic user device, the subsequent incoming video frames to identify and track video content based on the generated subsequent signatures,
receiving at the electronic user device, third party alternative content selected for display by the electronic user device to replace content at a specified time section in the identified and tracked video content, wherein the third party alternative content is selected from a menu of selectable options displayed on a second display screen associated with a user of the electronic user device.

19. The method of claim 18, wherein the third party alternative content includes a selection of content related information.

20. The method of claim 18, wherein the third party alternative content includes a selection of personal services.

21. The method of claim 18 further comprising: correcting the incoming video frames utilizing the calculated scale ratios Sx and Sy to generate a corrected incoming video stream.

22. A computer readable non-transitory medium encoded with computer readable program data and code, the computer readable program data and code when executed to perform:
detecting by an electronic user device, a scale ratio mapping between incoming video frames received by the electronic user device and reference video frames stored in a reference database by calculating a scale ratio along an x axis (Sx) and a different scale ratio along a y axis (Sy) for a query signature in an incoming video frame and a reliable matching reference signature in a corresponding reference video frame stored in the reference database, wherein the calculated scale ratios Sx and Sy indicate that the incoming video frame and the corresponding reference video frame are not in alignment;
responsive to calculating the scale ratio, using the detected scale ratio mapping to generate subsequent signatures for subsequent incoming video frames;
process by the electronic user device, the subsequent incoming video frames on the user device to identify and track video content based on the generated subsequent signatures,
receiving at the electronic user device, third party alternative content selected for display by the electronic user device to replace content at a specified time section in the identified and tracked video content, wherein the third party alternative content is selected from a menu of selectable options displayed on a second display screen associated with a user of the electronic user device.

* * * * *